US 11,139,497 B2

(12) United States Patent
Yun et al.

(10) Patent No.: US 11,139,497 B2
(45) Date of Patent: Oct. 5, 2021

(54) FUEL CELL SYSTEM USING NATURAL GAS

(71) Applicant: DOOSAN HEAVY INDUSTRIES & CONSTRUCTION CO., LTD., Changwon-Si (KR)

(72) Inventors: Choa Mun Yun, Daejeon (KR); Yun Sung Kim, Daejeon (KR); Gi Pung Lee, Daejeon (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 638 days.

(21) Appl. No.: 14/576,652

(22) Filed: Dec. 19, 2014

(65) Prior Publication Data

US 2015/0188172 A1    Jul. 2, 2015

(30) Foreign Application Priority Data

Dec. 31, 2013  (KR) .......................... 10-2013-0169267

(51) Int. Cl.
*H01M 8/0606* (2016.01)
*H01M 8/04007* (2016.01)
(Continued)

(52) U.S. Cl.
CPC ............ *H01M 8/0606* (2013.01); *F17C 9/04* (2013.01); *F25J 3/0409* (2013.01); *F25J 3/04187* (2013.01); *F25J 3/04266* (2013.01); *F25J 3/04278* (2013.01); *F25J 3/04527* (2013.01); *H01M 8/04007* (2013.01); *H01M 8/0612* (2013.01); *H01M 8/0618* (2013.01);
(Continued)

(58) Field of Classification Search
CPC ................................................... F25J 3/04266
See application file for complete search history.

(56) References Cited

U.S. PATENT DOCUMENTS 3,707,849 A * 1/1973 Becker ...................... F17C 9/04
                                                                    62/643
3,886,758 A * 6/1975 Perrotin .................... F17C 9/04
                                                                    62/651
(Continued)

FOREIGN PATENT DOCUMENTS

CA        2567586 A1    4/2008
EP        0467051 A1    1/1992
(Continued)

OTHER PUBLICATIONS

Communication from European Patent Office dated May 28, 2015 in a counterpart European Application No. 14199535.7.

*Primary Examiner* — John F Pettitt, III
(74) *Attorney, Agent, or Firm* — Invenstone Patent, LLC

(57) ABSTRACT

A fuel cell system using natural gas, which includes a fuel cell including a cathode and an anode and a cryogenic heat-exchanging apparatus configured to heat-exchange natural gas supplied from a natural gas station with introduced air or exhaust gas of the fuel cell. With the configuration, oxygen which is introduced into the fuel cell can be produced using cold energy of the natural gas, and energy consumed for the oxygen production can be reduced. Also, a discharge of seawater of low temperature can be minimized, thereby reducing negative effects caused by the discharge.

7 Claims, 9 Drawing Sheets

(51) Int. Cl.
*H01M 8/0612* (2016.01)
*H01M 8/0668* (2016.01)
*F25J 3/04* (2006.01)
*F17C 9/04* (2006.01)
*H01M 8/22* (2006.01)

(52) U.S. Cl.
CPC ............ *H01M 8/0668* (2013.01); *H01M 8/22* (2013.01); *F25J 2270/12* (2013.01)

(56) References Cited

U.S. PATENT DOCUMENTS

| | | | | |
|---|---|---|---|---|
| 4,615,716 A | * | 10/1986 | Cormier | F25J 3/04224 62/643 |
| 5,175,061 A | * | 12/1992 | Hildebrandt | H01M 8/04089 429/408 |
| 6,153,163 A | * | 11/2000 | Prasad | B01J 19/2475 252/373 |
| 2007/0214804 A1 | * | 9/2007 | Hannan | F17C 5/06 62/50.2 |
| 2010/0215566 A1 | | 8/2010 | Lourenco et al. | |
| 2010/0216039 A1 | * | 8/2010 | Jahnke | F22B 1/18 429/413 |
| 2012/0285162 A1 | * | 11/2012 | Ahn | H01M 8/04007 60/599 |
| 2013/0196240 A1 | * | 8/2013 | Furusawa | H01M 8/04388 429/429 |
| 2014/0190173 A1 | * | 7/2014 | Ozawa | F01D 21/00 60/773 |
| 2014/0245779 A1 | * | 9/2014 | Bohra | F25J 1/0015 62/611 |
| 2015/0030944 A1 | * | 1/2015 | Yun | H01M 8/0687 429/411 |

FOREIGN PATENT DOCUMENTS

| | | | | |
|---|---|---|---|---|
| JP | 2002-039674 A | | 2/2002 | |
| JP | 2007-018907 A | | 1/2007 | |
| KR | 10-2012-0082582 A | | 7/2012 | |
| WO | WO-2005081709 A2 | * | 9/2005 | ............... B01F 3/02 |

* cited by examiner

FUEL CELL SYSTEM USING NATURAL GAS

CROSS-REFERENCE TO RELATED APPLICATION

Pursuant to 35 U.S.C. § 119(a), this application claims the benefit of earlier filing date and right of priority to Korean Application No. 10-2013-0169267, filed on Dec. 31, 2013, the contents of which is incorporated by reference herein in its entirety.

BACKGROUND OF THE INVENTION

1. Field of the Disclosure

This specification relates to a fuel cell system using natural gas, and more particularly, a fuel cell system using natural gas, which is capable of heat-exchanging natural gas, which is supplied from a natural gas station to a consumer, with introduced air and/or exhaust gas of the fuel cell.

2. Background of the Disclosure

As well known, a fuel cell is an apparatus for converting chemical energy into electric energy.

Meanwhile, a natural gas station is a facility which includes a storage tank and a vaporizer, to vaporize stored liquefied natural gas and supply the vaporized gas to a consumer.

FIG. 1 is a block diagram illustrating a natural gas station and a fuel cell according to the related art.

As illustrated in FIG. 1, a fuel cell 10 and a natural gas station 60 according to the related art may be installed independent of each other to perform respective functions.

Some components of the related art fuel cell 10 generate electric energy using oxygen and carbon dioxide supplied to a cathode 30 and fuel supplied to an anode 50.

The related art natural gas station 60 vaporizes liquefied natural gas using an open rack vaporizer 70, which generally uses heat of seawater, and supply the vaporized gas to a consumer 90.

However, in the related fuel cell 10, an oxygen generator is used to extract oxygen from air, and a purification device is used to reduce exhaust gas of the fuel cell 10. Also, the oxygen generator and the exhaust gas purification device require for energy to be driven.

Also, in the related art natural gas station 60, seawater of low temperature, which is used in the open rack vaporizer 70 to vaporize the liquefied natural gas, is discharged into the ocean 80, thereby having a bad influence on sea creation resources, such as plankton, fishes, and the like.

SUMMARY OF THE INVENTION

Therefore, to solve those problems of the related art, an aspect of the detailed disclosure is to provide a fuel cell system using natural gas, capable of reducing energy, which is consumed by generating oxygen and/or reducing exhaust gas, using cold energy of natural gas.

Another aspect of the detailed disclosure is to provide a fuel cell system using natural gas, capable of minimizing negative effects caused by discharge of seawater of low temperature.

To achieve these and other advantages and in accordance with the purpose of this specification, as embodied and broadly described herein, there is provided a fuel cell system using natural gas, the fuel cell system using natural gas including a fuel cell including a cathode and an anode, and a cryogenic heat-exchanging apparatus configured to heat-exchange natural gas supplied from a natural gas station with introduced air or exhaust gas of the fuel cell.

Here, the cryogenic heat-exchanging apparatus may include an air separating unit that is configured to separate oxygen and nitrogen from air introduced thereto, and a cold box that is configured to cool air introduced into the air separating unit. The cold box may include a natural gas-air heat-exchanging portion that is configured to heat-exchange the natural gas supplied from the natural gas station with the air introduced into the air separating unit, so as to cool the air introduced in the air separating unit, and a liquefaction unit that is configured to liquefy oxygen contained in air passed through the natural gas-air heat-exchanging portion.

Oxygen produced in the cryogenic heat-exchanging apparatus may be supplied to the fuel cell.

The natural gas-air heat-exchanging portion may include a first chamber through which one of the natural gas supplied from the natural gas station and air introduced into the liquefaction unit passes, and a first passage that is provided in the first chamber to be heat-exchangeable, and through which the other of the natural gas supplied from the natural gas station and the air introduced into the liquefaction unit passes.

The liquefaction unit may include an oxygen-air heat-exchanging portion that is configured to heat-exchange the oxygen separated in the air separating unit with the air passed through the natural gas-air heat-exchanging portion, so as to cool the air passed through the natural gas-air heat-exchanging portion, and a nitrogen-air heat-exchanging portion that is configured to heat-exchange the nitrogen separated in the air separating unit with air passed through the oxygen-air heat-exchanging portion, so as to cool the air passed through the oxygen-air heat-exchanging portion.

The oxygen-air heat-exchanging portion may include a second chamber through which one of the oxygen separated in the air separating unit and the air passed through natural gas-air heat-exchanging portion passes, and a second passage that is provided within the second chamber to be heat-exchangeable, and through which the other of the oxygen separated in the air separating unit and the air passed through natural gas-air heat-exchanging portion passes.

The nitrogen-air heat-exchanging portion may include a third chamber through which one of the nitrogen separated in the air separating unit and the air passed through the oxygen-air heat-exchanging portion passes, and a third passage that is provided within the third chamber to be heat-exchangeable, and through which the other of the nitrogen separated in the air separating unit and the air passed through the oxygen-air heat-exchanging portion passes.

The liquefaction unit may include a refrigerant chamber through which a refrigerant of a refrigerating cycle device passes, and a refrigerant chamber air passage that is provided within the refrigerant chamber to be heat-exchangeable, and through which air passed through the nitrogen-air heat-exchanging portion passes. Within the refrigerant chamber, the refrigerant may be evaporated by absorbing latent heat therearound and the air passed through the nitrogen-air heat-exchanging portion may be further cooled by the refrigerant.

The oxygen produced in the cryogenic heat-exchanging apparatus may be supplied into the cathode.

The cryogenic heat-exchanging apparatus may include a gas heat-exchanging unit that is configured to heat-exchange the natural gas supplied from the natural gas station with exhaust gas of the anode, so as to cool the anode exhaust gas.

The fuel cell may include a water-gas shift reaction unit that is configured to convert carbon monoxide contained in the anode exhaust gas into hydrogen and carbon dioxide. Here, the gas heat-exchanging unit may include a first gas heat-exchanging unit that is configured to heat-exchange the natural gas supplied from the natural gas station with the anode exhaust gas passed through the water-gas shift reaction unit, so as to liquefy vapor contained in the anode exhaust gas passed through the water-gas shift reaction unit, a first separator that is configured to separate water contained in the anode exhaust gas passed through the first gas heat-exchanging unit, a second gas heat-exchanging unit that is configured to heat-exchange the natural gas supplied from the natural gas station with the anode exhaust gas passed through the first separator, so as to liquefy carbon dioxide contained in the anode exhaust gas passed through the first separator, and a second separator that is configured to separate the liquefied carbon dioxide from hydrogen, both contained in the anode exhaust gas passed through the second gas heat-exchanging unit.

The natural gas supplied from the natural gas station may pass through the first gas heat-exchanging unit via the second gas heat-exchanging unit.

The first gas heat-exchanging unit may include a fourth chamber through which one of the natural gas supplied from the natural gas station and the anode exhaust gas passed through the water-gas shift reaction unit passes, and a fourth passage that is provided within the fourth chamber to be heat-exchangeable, and through which the other of the natural gas supplied from the natural gas station and the anode exhaust gas passed through the water-gas shift reaction unit passes.

The second gas heat-exchanging unit may include a fifth chamber through which one of the natural gas supplied from the natural gas station and the anode exhaust gas passed through the first separator passes, and a fifth passage that is provided within the fifth chamber to be heat-exchangeable, and through which the other of the natural gas supplied from the natural gas station and the anode exhaust gas passed through the first separator passes.

The gas heat-exchanging unit may include a third gas heat-exchanging unit that is configured to heat-exchange the natural gas supplied from the natural gas station with at least part of the liquefied carbon dioxide passed through the second separator, such that the at least part of the liquefied carbon dioxide passed through the second separator is solidified into dry ice. Here, the natural gas supplied from the natural gas station may be introduced into the second gas heat-exchanging unit via the third gas heat-exchanging unit.

The third heat-exchanging unit may include a sixth chamber through which one of the natural gas supplied from the natural gas station and the liquefied carbon dioxide passed through the second separator passes, and a sixth passage that is provided within the sixth chamber to be heat-exchangeable, and through which the other of the natural gas supplied from the natural gas station and the liquefied carbon dioxide passed through the second separator passes.

The fuel cell may include an oxidation catalyzing unit that is configured to remove hydrogen or carbon monoxide from the anode exhaust gas.

The gas heat-exchanging unit may include a first gas heat-exchanging unit that is configured to heat-exchange the natural gas supplied from the natural gas station with the anode exhaust gas passed through the oxidation catalyzing unit, so as to liquefy vapor contained in the anode exhaust gas passed through the oxidation catalyzing unit, a first separator that is configured to separate water contained in the anode exhaust gas passed through the oxidation catalyzing unit, and a second gas heat-exchanging unit that is configured to heat-exchange the natural gas supplied from the natural gas station with the anode exhaust gas passed through the first separator, so as to liquefy carbon dioxide contained in the anode exhaust gas passed through the first separator.

The natural gas supplied from the natural gas station may pass through the first gas heat-exchanging unit via the second gas heat-exchanging unit.

The first gas heat-exchanging unit may include a fourth chamber through which one of the natural gas supplied from the natural gas station and the anode exhaust gas passed through the oxidation catalyzing unit passes, and a fourth passage that is provided within the fourth chamber to be heat-exchangeable, and through which the other of the natural gas supplied from the natural gas station and the anode exhaust gas passed through the oxidation catalyzing unit passes.

The second heat-exchanging unit may include a fifth chamber through which one of the natural gas supplied from the natural gas station and the anode exhaust gas passed through the first separator passes, and a fifth passage that is provided within the fifth chamber to be heat-exchangeable, and through which the other of the natural gas supplied from the natural gas station and the anode exhaust gas passed through the first separator passes.

The gas heat-exchanging unit may include a third gas heat-exchanging unit that is configured to heat-exchange the natural gas supplied from the natural gas station with at least part of the liquefied carbon dioxide passed through the second gas heat-exchanging unit, such that the at least part of the liquefied carbon dioxide passed through the second gas heat-exchanging unit is solidified into dry ice.

The natural gas supplied from the natural gas station may be introduced into the second gas heat-exchanging unit via the third gas heat exchanging unit.

The third gas heat-exchanging unit may include a sixth chamber through which one of the natural gas supplied from the natural gas station and the liquefied carbon dioxide passed through the second gas heat-exchanging unit passes, and a sixth passage that is provided within the sixth chamber to be heat-exchangeable, and through which the other of the natural gas supplied from the natural gas station and the liquefied carbon dioxide passed through the second gas heat-exchanging unit passes.

The cryogenic heat-exchanging apparatus may include an air separating unit that is configured to separate oxygen and nitrogen from air introduced thereto, and a cold box that is configured to cool the air introduced into the air separating unit. Here, the cold box may include a natural gas-air heat-exchanging portion that is configured to heat-exchange the natural gas supplied from the natural gas station with the air introduced into the air separating unit, so as to cool the air introduced into the air separating unit, and a liquefaction unit that is configured to cool and liquefy the air passed through the natural gas-air heat-exchanging portion. Oxygen generated in the cryogenic heat-exchanging apparatus may be supplied to the oxidation catalyzing unit.

Further, there is provided a fuel cell system including a fuel cell including a cathode and an anode, and a cryogenic heat-exchanging apparatus configured to heat-exchange natural gas supplied from a natural gas station with introduced air or exhaust gas of the fuel cell.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Description will now be given in detail of the preferred embodiments of a fuel cell using natural gas according to the present disclosure, with reference to the accompanying drawings.

Prior to explaining the present disclosure, it should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly.

Therefore, the configurations illustrated in the exemplary embodiments and drawings provided herein are merely illustrative and do not represent every technical scope of the present disclosure. It should thusly be understood that there can be various equivalents and variations to replace those configurations at the moment that the present disclosure is filed.

Figure 1:
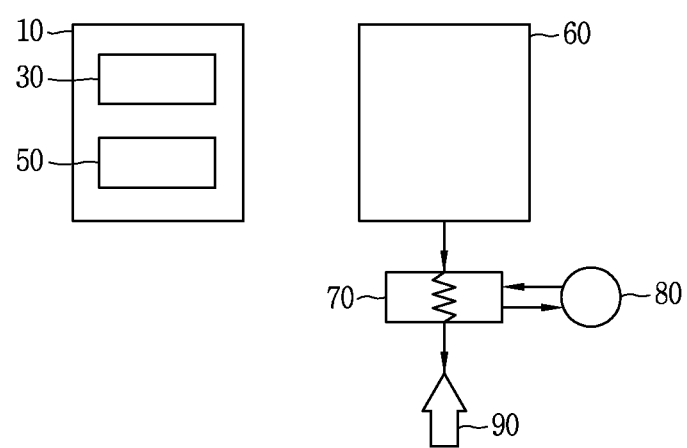
FIG. 1 is a block diagram illustrating a natural gas station and a fuel cell according to the related art.
Figure 2:
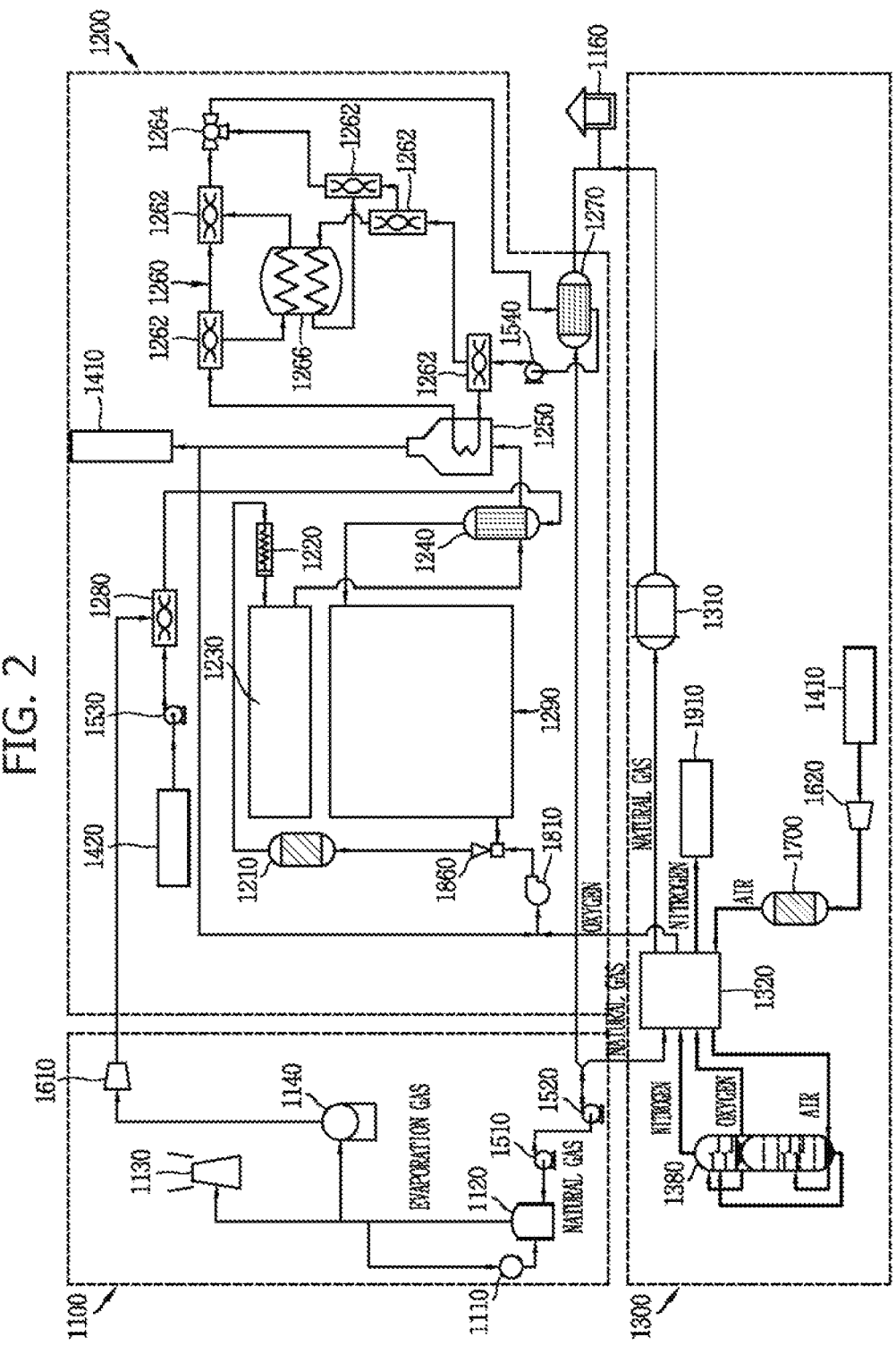
FIG. 2 is a block diagram illustrating a fuel cell system using natural gas in accordance with a first exemplary embodiment disclosed herein.
Figure 3:
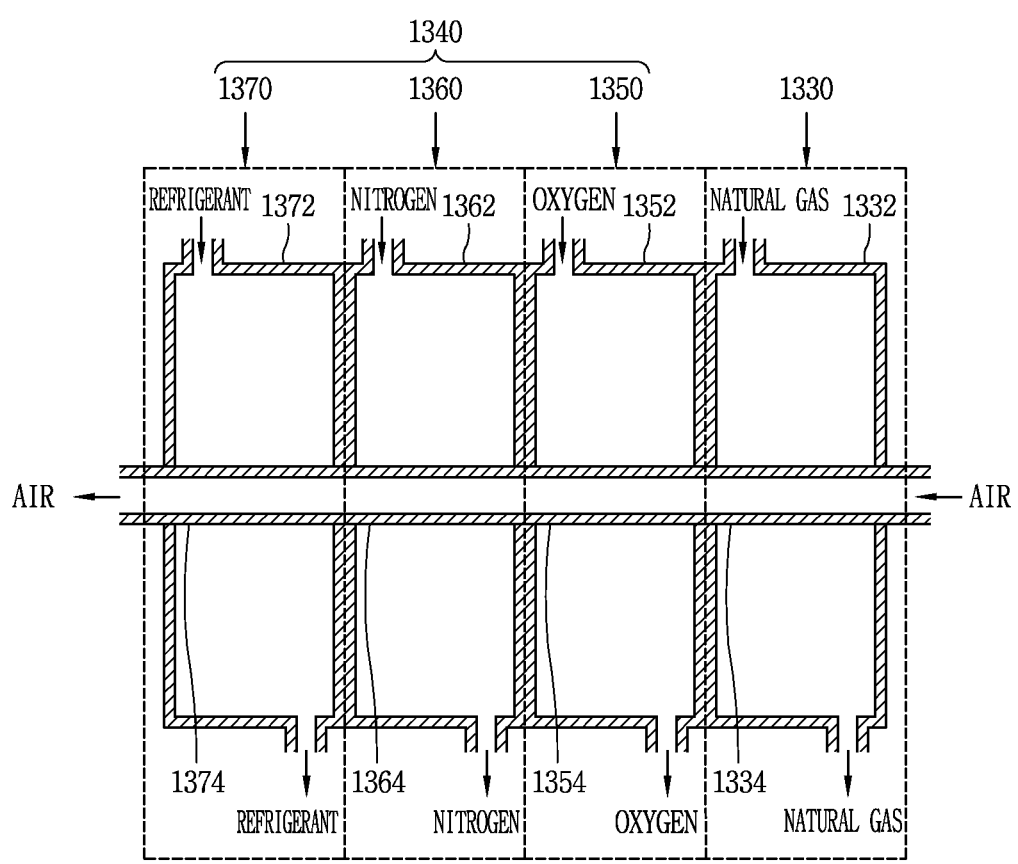
FIG. 3 is a block diagram illustrating a cold box structure of FIG. 2.

As illustrated in FIGS. 2 and 3, a fuel cell system using natural gas according to a first exemplary embodiment disclosed herein may include a natural gas station 1100 which supplies natural gas to a natural gas consumer 1160, a fuel cell 1200 having a cathode 1230 and an anode 1290, and a cryogenic heat-exchanging apparatus 1300 which heat-exchanges natural gas supplied from the natural gas station 1100 and introduced air of the fuel cell 1200 with each other.

The natural gas station 1100, for example, may include a carrier 1110 which carries natural gas, a storage tank 1120 which stores the natural gas supplied from the carrier 1110, and pumps 1510 and 1520 which pump the natural gas stored in the storage tank 1120 to the natural gas consumer 1160. This structure is already well known, so detailed description thereof will be omitted.

The natural gas station 1100 may include a waste gas burner 1130 which burns boil of gas (BOG) which is generated during storage. Also, the natural gas station 1100 may provide the BOG to a BOG consumer.

The natural gas station 1100, for example, may include a buffer tank 1140 which temporarily stores the BOG, and a compressor 1610 which presses the BOG discharged from the buffer tank 1140 and supplies the compressed BOG to the BOG consumer. This structure is already well known, so detailed description thereof will be omitted.

The fuel cell 1200, for example, may include a fuel mixing unit 1280 which mixes the BOG introduced from the natural gas station 1100 with water supplied from a water supply unit 1420.

A pump 1530 which pumps water supplied to the fuel mixing unit 1280 may be provided between the water supply unit 1420 and the fuel mixing unit 1280.

The fuel cell 1200 may include a cathode 1230 which generates carbonate ion ($CO_3^{2-}$) from oxygen and carbon dioxide.

An equation of the cathode 1230 may be expressed as follows.

$$(\tfrac{1}{2})O_2 + CO_2 + 2e^- \rightarrow CO_3^{2-}$$

Oxygen introduced into the cathode 1230 may be supplied from the cryogenic heat-exchanging apparatus 1300.

Carbon dioxide introduced into the cathode 1230, for example, may be supplied in a manner that exhaust gas discharged from the anode 1290 (hereinafter, referred to as anode exhaust gas) is introduced into the cathode 1230.

Also, carbon dioxide introduced into the cathode 1230 may be supplied in a manner that a part of exhaust gas, which is discharged from the cathode 1230 after generating the carbonate ion (hereinafter, referred to as cathode exhaust gas), is recycled into the cathode 1230.

The fuel cell 1200 may include the anode 1290 which generates hydrogen from methane and water, and generate electrons from the generated hydrogen and carbonate ion.

An equation of the anode 1290 may be expressed as follows, for example.

$$CH_4 + 2H_2O \rightarrow 4H_2 + CO_2$$

$$H_2 + CO_3^{2-} \rightarrow H_2O + CO_2 + 2e^-$$

The methane and water of the anode 1290 may be supplied from the fuel mixing unit 1280.

The carbonate ion of the anode 1290 may be supplied from the cathode 1230.

The anode 1290 may discharge the anode exhaust gas, which contains vapor, carbon dioxide, unreacted hydrogen, and carbon monoxide, after generating electrons.

The fuel cell 1200 may include a blower 1810 which blows (presses) mixed gas, in which oxygen generated in the cryogenic heat-exchanging apparatus 1300 and some of the cathode exhaust gas introduced into the cathode are mixed with each other.

The fuel cell 1200 may include an ejector 1860, which is configured such that gas supplied from the blower 1810 is introduced through one side thereof, and the anode exhaust gas is introduced through the other side thereof.

The fuel cell 1200 may also include an oxidizer 1210 which is provided between the ejector 1860 and the cathode 1230 to remove hydrogen and carbon monoxide from gas supplied from the ejector 1860 to the cathode 1230.

Here, a part of the cathode discharge gas may be introduced into the cathode 1230 and most of the anode discharge gas may be introduced into the cathode 1230, such that carbon dioxide can be supplied to the cathode 1230.

Meanwhile, the fuel cell 1200 may include a plurality of heat-exchanging apparatuses.

The plurality of heat-exchanging apparatuses may include a cathode exhaust gas-anode fuel heat-exchanging apparatus 1240 which heats the methane and water supplied from the fuel mixing unit 1280 to the anode 1290 using waste heat of the cathode exhaust gas.

The plurality of heat-exchanging apparatuses may include a cathode exhaust gas-circulation line heat-exchanging apparatus 1250 which heats a circulation line 1260, which will be explained later, using the waste heat of the cathode exhaust gas, and a submerged combustion vaporizer (SMV) 1270 which supplies vaporization heat to the natural gas supplied from the natural gas station 1100 using heat of the circulation line 1260.

The circulation line 1260 may be formed as a closed loop having one region which is heat-exchanged with the cathode exhaust gas-circulation line heat-exchanging apparatus 1250, and the other region which is heat-exchanged with the SMV 1270.

Water may circulate in the circulation line 1260. That is, water temperature of which is increased by the heat exchange with the cathode exhaust gas-circulation line heat-exchanger 1250, may heat-exchange with the natural gas in the SMV 1270 and supply vaporization heat of the natural gas, such that the natural gas can be vaporized.

The circulation line 1260, for example, may include a pump 1540 which pumps the water, a heat storage space 1266 in which heat is temporarily stored, and a distributor 12623 and a three-way valve 1264 which adjust a circulating (moving) direction of the water. Those elements are already well known, so detailed description thereof will be omitted.

With the configuration, the circulation line 1260 may supply the vaporization heat of the natural gas to the natural gas, which is supplied from the natural gas station 1100 through the SMV 1270, using the waste heat of the cathode exhaust gas supplied from the cathode exhaust gas-circulation line heat-exchanging apparatus 1250.

The fuel cell 1200, for example, may include a heater 1220 which heats oxygen and carbon dioxide supplied to the cathode 1230.

Meanwhile, the cryogenic heat-exchanging apparatus 1300 may include a cold box 1320 which cools air introduced from an atmosphere 1410, and an air separating unit 1380 which separates oxygen and nitrogen from the air passed through the cold box 1320.

The cold box 1320, for example, as illustrated in FIG. 3, may include a natural gas air heat-exchanging portion 1330 which heat-exchanges liquefied natural gas supplied from the natural gas station 1100 with the air introduced from the atmosphere 1410, and a liquefaction unit 1340 which liquefies oxygen in the air by cooling the air passed through the natural gas air heat-exchanging portion 1330.

The natural gas air heat-exchanging portion 1330 may heat-exchange the liquefied natural gas supplied from the natural gas station 1100 with the air introduced from the atmosphere 1410, such that the liquefied natural gas can be heated and the air can be cooled.

The natural gas air heat-exchanging portion 1330 may include a first chamber 1332 (a natural gas chamber of the cold box) through which the liquefied natural gas supplied from the natural gas station 1100 passes.

The natural gas air heat-exchanging portion 1330 may include a first passage 1334 (an air passage within the natural gas chamber of the cold box), which is disposed within the first chamber 1332 to be heat-exchangeable, and through which the air introduced from the atmosphere 1410 passes.

The liquefaction unit 1340 may include an oxygen-air heat-exchanging portion 1350 which heat-exchanges liquefied oxygen separated in the air separating unit 1380 with the air passed through the natural gas-air heat-exchanging portion 1330.

The oxygen-air heat-exchanging portion 1350 may heat the liquefied oxygen separated in the air separating unit 1380 and cool the air passed through the natural gas-air heat-exchanging portion 1330, in the heat-exchanging manner.

The oxygen-air heat-exchanging portion 1350 may include a second chamber 1352 (an oxygen chamber of the cold box) through which the liquefied oxygen separated in the air separating unit 1380 passes.

Also, the oxygen-air heat-exchanging portion 1350 may include a second passage 1354 (an air passage within the oxygen chamber of the cold box), which is disposed within the second chamber 1352 to be heat-exchangeable, and through which the air passed through the natural gas-air heat-exchanging portion 1330 passes.

The liquefaction unit 1340 may include a nitrogen-air heat-exchanging portion 1360 which heat-exchanges the nitrogen separated in the air separating unit 1380 with the air passed through the oxygen-air heat-exchanging portion 1350.

The nitrogen-air heat-exchanging portion 1360 may heat the nitrogen separated in the air separating unit 1380 and cool the air passed through the oxygen-air heat-exchanging portion 1350, in the heat-exchanging manner.

The nitrogen-air heat-exchanging portion 1360 may include a third chamber 1362 (a nitrogen chamber of the cold box) through which the nitrogen separated in the air separating unit 1380 passes.

The nitrogen-air heat-exchanging portion 1360 may include a third passage 1364 (an air passage within the nitrogen chamber of the cold box), which is disposed within the third chamber 1362 to be heat-exchangeable, and through which the air passed through the oxygen-air heat-exchanging portion 1350 passes.

The liquefaction unit 1340 may include a refrigerating cycle device which is driven by electric energy to cool the air passed through the nitrogen-air heat-exchanging portion 1360.

The refrigerating cycle device may be implemented as a so-called vapor compression type refrigerating cycle device, which includes a compressing unit (not illustrated) which compresses a refrigerant, a condensing unit (not illustrated) in which the refrigerant is condensed by radiating heat, an evaporating unit 1370 in which the refrigerant absorbs latent heat to be evaporated, and an expansion unit (not illustrated) which decompresses and expands the refrigerant. The refrigerating cycle device is already well known, so detailed description thereof will be omitted.

The evaporating unit 1370 may include a refrigerant chamber 1372 (a refrigerant chamber of the cold box) through which the refrigerant passes.

The evaporating unit 1370 may include a refrigerant chamber air passage 1374 (an air passage within the refrigerant chamber of the cold box), which is disposed within the refrigerant chamber 1372 to be heat-exchangeable, and through which the air passed through the nitrogen-air heat-exchanging portion 1360 passes.

Here, the natural gas-air heat-exchanging portion 1330 may be configured such that the air introduced from the atmosphere 1410 passes through the first chamber 1332, and the liquefied natural gas supplied from the natural gas station 1100 passes through the first passage 1334.

The oxygen-air heat-exchanging portion 1350 may be configured such that the air passed through the natural gas-air heat-exchanging portion 1330 passes through the second chamber 1352 and the liquefied oxygen separated in the air separating unit 1380 passes through the second passage 1354.

The nitrogen-air heat-exchanging portion 1360 may be configured such that the air passed through the oxygen-air heat-exchanging portion 1350 passes through the third chamber 1362 and the nitrogen separated in the air separating unit 1380 passes through the third passage 1364.

The evaporating unit 1370 may be configured such that the air passed through the nitrogen-air heat-exchanging portion 1360 passes through the refrigerant chamber 1372 and the refrigerant passes through the refrigerant chamber air passage 1374.

Here, for the sake of explanation, description has been given of the case where each of the first passage 1334, the second passage 1354, the third passage 1364 and the refrigerant chamber air passage 1374 is formed in a shape of a single pipe, but each of those passages may also be configured to be divided into plural passages.

Also, for the sake of explanation, description has been given of the case where each of the first passage 1334, the second passage 1354, the third passage 1364 and the refrigerant chamber air passage 1374 is formed in a shape of a single straight pipe, but each of those passages may also be formed in a spiral shape to have an increased heat-exchange area.

With the configuration, the air introduced from the atmosphere 1410 may be cooled by the liquefied natural gas while flowing through the natural gas-air heat-exchanging portion 1330.

The air passed through the natural gas-air heat-exchanging portion 1330 may be further cooled by the liquefied oxygen while flowing through the oxygen-air heat-exchanging portion 1350.

The air passed through the oxygen-air heat-exchanging portion 1350 may be more cooled by the nitrogen while flowing through the nitrogen-air heat-exchanging portion 1360.

The air passed through the nitrogen-air heat-exchanging portion 1360 may be cooled down, for example, to a temperature below −183° C. and above −197° C., by the refrigerant while flowing through the evaporating unit 1370.

In such a manner, by using cold energy of the liquefied natural gas, the liquefied oxygen and the nitrogen for cooling air prior to liquefaction, a quantity of electric energy which is consumed for driving the refrigerating cycle device can be remarkably reduced, as compared to cooling air of room temperature down to a liquefaction temperature only by the refrigerating cycle device.

However, the configuration may not be limited to this. For example, the sequential configuration order of the natural gas-air heat-exchanging portion 1330, the oxygen-air heat-exchanging portion 1350, the nitrogen-air heat-exchanging portion 1360 and the refrigerating cycle device may be changed if the cold energy can be moved from the liquefied natural gas, the liquefied oxygen, the nitrogen and the refrigerating cycle device, which are a source, to the air which is a sink.

Also, this exemplary embodiment illustrates the case of including both the oxygen-air heat-exchanging portion 1350 and the nitrogen-air heat-exchanging portion 1360, but it may also be possible to employ one of the oxygen-air heat-exchanging portion 1350 and the nitrogen-air heat-exchanging portion 1360.

The air separating unit 1380 may separate the air cooled by the cold box 1320 using the liquefied oxygen and the nitrogen (or liquefied nitrogen).

Meanwhile, the cryogenic heat-exchanging apparatus 1300, for example, may include a compressor 1620 which compresses the air introduced from the atmosphere 1410 and supplies the compressed air to the cold box 1320, and an air purifier 1700 which removes impurities from the air introduced into the cold box 1320.

Also, the cryogenic heat-exchanging apparatus 1300, for example, may include an open rack vaporizer 1310 which supplies vaporization heat to the natural gas supplied from the natural gas station 1100 using heat of seawater.

The open rack vaporizer 1310, for example, may be installed on a natural gas supply line which extends from the natural gas station 1100 to the natural gas consumer 1160.

Hereinafter, operation effects of the fuel cell system using the natural gas according to the first exemplary embodiment will be described with reference to FIGS. 2 and 3.

First, the air introduced from the atmosphere 1410 may be cooled while passing through the cold box 1320.

The air passed through the cold box 1320 may pass through the air separating unit 1380, thereby being separated into the nitrogen and the liquefied oxygen.

In more detail, the air introduced from the atmospheric air 1410 may be introduced into the first passage 1334 of the natural gas-air heat-exchanging portion 1330.

The air introduced in the first passage 1334 may be cooled by the liquefied natural gas which is supplied from the natural gas station 1100 and passes through the first chamber 1332.

The air passed through the first passage 1334 may be introduced into the second passage 1354.

The air introduced in the second passage 1354 may be cooled by the liquefied oxygen, which is produced in the air separating unit 1380 and passes through the second chamber 1352.

The air passed through the second passage 1354 may be introduced into the third passage 1364.

The air introduced in the third passage 1364 may be cooled by the nitrogen which is produced in the air separating unit 1380 and passes through the third chamber 1362.

The air passed through the third passage 1364 may be introduced into the refrigerant chamber air passage 1374.

The air introduced in the refrigerant chamber air passage 1374 may be cooled by the refrigerant passed through the refrigerant chamber 1372.

The air passed through the refrigerant chamber air passage 1374 may be introduced into the air separating unit 1380.

The air introduced into the air separating unit 1380 may be separated into liquefied oxygen and nitrogen.

The liquefied oxygen separated by the air separating unit 1380 may be vaporized by absorbing heat from inner air of the second passage 1354 while passing through the second chamber 1352.

The vaporized oxygen may be introduced into the cathode 1230 via the blower 1810, the ejector 1860, the oxidizer 1210 and the heater 1220.

Meanwhile, the nitrogen separated by the air separating unit 1380 may supply cold energy to inner air of the third passage 1364 while passing through the third chamber 1362, thereby being collected in a nitrogen storage space 1910.

The carbon dioxide included in the anode exhaust gas and the cathode exhaust gas may be supplied to the cathode 1230.

That is, the anode exhaust gas may be introduced into the cathode 1230 via the ejector 1860, the oxidizer 1210 and the heater 1220.

The cathode exhaust gas may be introduced into the cathode 1230 via the blower 1810, the ejector 1860, the oxidizer 1210 and the heater 1220.

Here, the carbon dioxide included in the anode exhaust gas may be carbon dioxide which is generated during a process of generating the electrons in the anode.

Meanwhile, the carbon dioxide included in the cathode exhaust gas may be carbon dioxide which is discharged without being reacted during a process of generating the carbonate ion in the cathode.

The cathode 1230 may generate the carbonate ion from the introduced oxygen and carbon dioxide.

The carbonate ion generated in the cathode 1230 may be supplied to the anode 1290.

The cathode 1230 may discharge the cathode exhaust gas after generating the carbonate ion.

The cathode exhaust gas may be partially introduced into the cathode 1230 via the cathode exhaust gas-anode fuel heat-exchanging apparatus 1240 and the cathode exhaust gas-circulation line heat-exchanging apparatus 1250.

The rest of the cathode exhaust gas which has not been introduced into the cathode 1230 may be discharged to the atmosphere 1410, for example.

The anode 1290 may generate hydrogen from methane and water, which are supplied from the fuel mixing unit 1280 via the cathode exhaust gas-anode fuel heat-exchanger 1240.

Also, the anode 1290 may generate electrons using the hydrogen generated in the anode 1290 and the carbonate ion supplied from the cathode 1230.

The electrons may generate electric energy while passing through an external circuit (not illustrated).

The anode 1290 may discharge the anode exhaust gas, which contains vapor, carbon dioxide, unreacted hydrogen and carbon monoxide, while generating the electrons.

Most of the anode exhaust gas may be introduced into the cathode 1230.

Meanwhile, a natural gas supply line through which the natural gas is supplied from the natural gas station 1100 to the natural gas consumer 1160 may be divided into two lines.

Natural gas supplied through one of the two divided lines may be vaporized by absorbing heat from the air which is introduced into the air separating unit 1380 through the cold box 1320, and absorbing heat from seawater through the open rack vaporizer 1310.

Natural gas supplied through the other of the two divided lines may be vaporized by absorbing heat from the circulation line 1260 through the submerged combustion vaporizer (SMV) 1270.

The vaporized natural gas may be supplied to the natural gas consumer 1160.

Here, the fuel cell system using the natural gas according to the first exemplary embodiment may produce the oxygen which is introduced into the fuel cell 1200 using the cold energy of the natural gas supplied from the natural gas station 1100. This may result in reduction of electric energy consumed for the oxygen production.

Also, the fuel cell using the natural gas according to the first exemplary embodiment may use the carbon dioxide, which the anode 1290 discharges after generating the electrons, to generate the carbonate ion. Accordingly, an amount of carbon dioxide discharged by the fuel cell can be reduced, resulting in preventing environmental pollution.

In more detail, the carbon dioxide discharged from the anode 1290 may be introduced into the cathode 1230 to be converted into the carbonate ion, which may result in a reduction of an amount of carbon dioxide discharged.

Also, some of the carbon dioxide, which has been discharged from the anode 1290 and introduced into the cathode 1230 but discharged without being converted into the carbonate ion, may be reintroduced into the cathode 1230 and converted into the carbonate ion, such that the amount of carbon dioxide discharged can be reduced.

Also, the fuel cell using the natural gas according to the first exemplary embodiment may vaporize the natural gas supplied to the natural gas consumer 1610 by using heat of the air introduced from the atmosphere 1410.

Accordingly, an amount of seawater of low temperature which is discharged to the ocean after used for vaporizing the natural gas can be reduced, thereby preventing a bad influence caused due to the seawater of low temperature.

Figure 4:
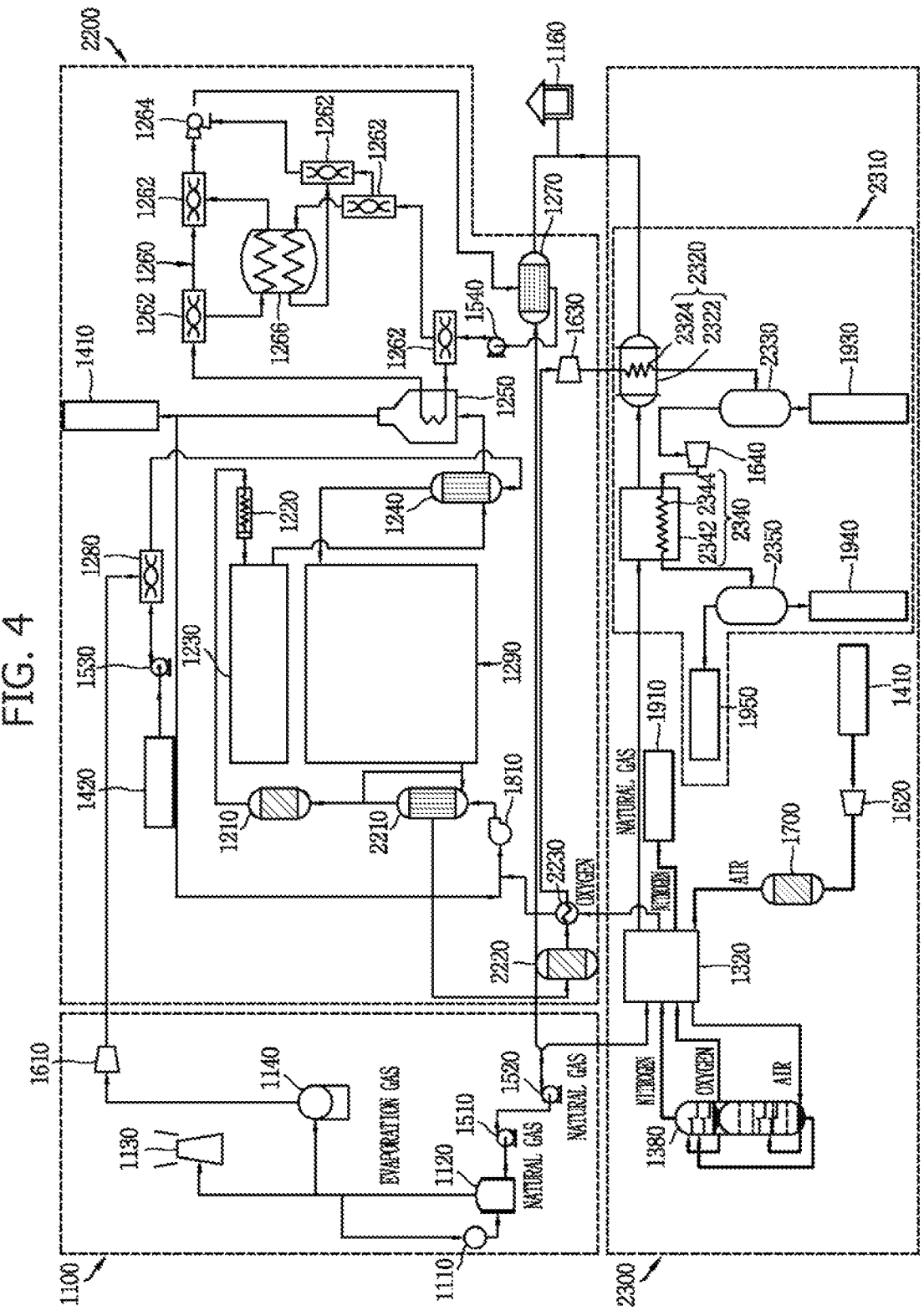
FIG. 4 is a block diagram illustrating a fuel cell system using natural gas in accordance with a second exemplary embodiment disclosed herein.

FIG. 4 is a block diagram illustrating a fuel cell using natural gas in accordance with a second exemplary embodiment disclosed herein.

As illustrated in FIG. 4, a fuel cell system using natural gas according to a second exemplary embodiment may include a natural gas station 1100 which supplies natural gas to a natural gas consumer 1160, a fuel cell 2200 having a cathode 1230 and an anode 1290, and a cryogenic heat-exchanging apparatus 2300 which heat-exchanges the natural gas supplied from the natural gas station 1100 with introduced air and exhaust gas of the fuel cell 2200.

The fuel cell using the natural gas according to the second exemplary embodiment is different from that of the first exemplary embodiment in view of an anode exhaust gas discharge line.

The anode exhaust gas discharge line may include a first anode exhaust gas-cathode fuel heat-exchanging apparatus 2210 which heats oxygen, which is introduced into the cathode 1230 via the oxidizer 1210, and the cathode exhaust gas using waste heat of the anode exhaust gas.

Also, the anode exhaust gas discharge line may include a water-gas shift reaction unit 2220 which converts (shifts) carbon monoxide of the anode exhaust gas, which has been passed through the first anode exhaust gas-cathode fuel heat-exchanging apparatus 2210, into hydrogen and carbon dioxide.

Also, the anode exhaust gas discharge line may include a second anode exhaust gas-cathode fuel heat-exchanging apparatus 2230 which heats oxygen passed through the cold box 1320 using anode exhaust gas, which has been passed through the water-gas shift reaction unit 2220.

Here, a part of the anode exhaust gas may be introduced into a gas heat-exchanging unit 2310, which will be explained later, via the first anode exhaust gas-cathode fuel heat-exchanging apparatus 2210, the water-gas shift reaction unit 2220, and the second anode exhaust gas-cathode fuel heat-exchanging apparatus 2230. The rest of the anode exhaust gas may be introduced into the cathode 1230.

The anode exhaust gas discharge line may include a gas heat-exchanging unit 2310 which produces by-products from the anode exhaust gas.

The gas heat-exchanging unit 2310, for example, may include a first gas heat-exchanging unit 2320 which liquefies vapor (or steam) of the anode exhaust gas passed through the second anode exhaust gas-cathode fuel heat-exchanging apparatus 2230.

The first gas heat-exchanging unit 2320 may heat-exchange natural gas passed through a fifth chamber 2342 (a natural gas chamber of the second gas heat-exchanging unit), which will be explained later, with the anode exhaust gas passed through the second anode exhaust gas-cathode fuel heat-exchanging apparatus 2230.

The first gas heat-exchanging unit 2320 may include a fourth chamber 2322 (a natural gas chamber of the first gas heat-exchanging unit), through which the natural gas passed through the fifth chamber 2342 passes.

The first gas heat-exchanging unit 2320 may include a fourth passage 2324 (an anode exhaust gas passage within the natural gas chamber of the first gas heat-exchanging unit), which is disposed within the fourth chamber 2322 to be heat-exchangeable, and through which the anode exhaust gas passed through the second anode exhaust gas-cathode fuel heat-exchanging apparatus 2230 passes.

The gas heat-exchanging unit 2310 may include a first separator 2330 which separates water, which is contained in the anode exhaust gas passed through the first gas heat-exchanging unit 2320, from hydrogen and carbon dioxide contained in the anode exhaust gas.

The gas heat-exchanging unit 2310 may include a second gas heat-exchanging unit 2340 which liquefies the carbon dioxide contained in the anode exhaust gas passed through the first separator 2330.

The second gas heat-exchanging unit 2340 may heat-exchange the natural gas passed through the cold box 1320 with the anode exhaust gas passed through the first separator 2330.

The second gas heat-exchanging unit 2340 may include a fifth chamber 2342 (the natural gas chamber of the second gas heat-exchanging unit), through which the natural gas passed through the cold box 1320 is passed.

The second gas heat-exchanging unit 2340 may include a fifth passage 2344 (an anode exhaust gas passage within the natural gas chamber of the second gas heat-exchanging unit), which is disposed within the fifth chamber 2342 to be heat-exchangeable, and through which the anode exhaust gas passed through the first separator 2330 passes.

The gas heat-exchanging unit 2310 may include a second separator 2350 which separates the liquefied carbon dioxide, which is contained in the anode exhaust gas passed through the second gas heat-exchanging unit 2340, from hydrogen.

Here, the first gas heat-exchanging unit 2320 may be configured such that the anode exhaust gas passed through the second anode exhaust gas-cathode fuel heat-exchanging apparatus 2230 passes through the fourth chamber 2322 and the natural gas passed through the fifth chamber 2342 passes through the fourth passage 2324.

Also, the second gas heat-exchanging unit 2340 may be configured such that the anode exhaust gas passed through the first separator 2330 passes through the fifth chamber 2342, and the natural gas passed through the cold box 1320 passes through the fifth passage 2344.

Detailed description of other same/like components to the first exemplary embodiment will be omitted to avoid redundant explanation.

Hereinafter, operation effects of the fuel cell using the natural gas according to the second exemplary embodiment will be described with reference to FIG. 4.

First, the air introduced from the atmosphere 1410 may be cooled while passing through the cold box 1320.

The air passed through the cold box 1320 may be separated (or divided) into nitrogen and liquefied oxygen while passing through the air separating unit 1380.

Detailed description thereof is the same as the first exemplary embodiment, so as to be omitted to avoid redundant explanation.

The liquefied oxygen separated by the air separating unit 1380 may be vaporized by absorbing heat from inner air of the second passage 1354 while passing through the second chamber 1352.

The vaporized oxygen may be introduced into the cathode 1230 sequentially via the second anode exhaust gas-cathode fuel heat-exchanging apparatus 2230, the blower 1810, the first anode exhaust gas-cathode fuel heat-exchanging apparatus 2210, the oxidizer 1210 and the heater 1220.

The nitrogen separated by the air separating unit 1380 may supply cold energy to inner air of the third passage 1364 while passing through the third chamber 1362.

The nitrogen which has supplied the cold energy to the inner air of the third passage 1364 may be collected in the nitrogen storage space 1910.

Meanwhile, the carbon dioxide contained in the anode exhaust gas and the cathode exhaust gas may be supplied to the cathode 1230.

That is, the anode exhaust gas may partially be introduced into the cathode 1230 via the oxidizer 1210 and the heater 1220.

The cathode exhaust gas may partially be introduced into the cathode 1230 sequentially via the blower 1810, the first anode exhaust gas-cathode fuel heat-exchanging apparatus 2210, the oxidizer 1210 and the heater 1220.

Here, the carbon dioxide contained in the anode exhaust gas may be carbon dioxide which is generated during the process of generating the electrons in the anode 1290.

Meanwhile, the carbon dioxide contained the cathode exhaust gas may be carbon dioxide which is discharged without being reacted during the process of generating the carbonate ion in the cathode 1230.

The cathode 1230 may generate the carbonate ion from the introduced oxygen and the carbon dioxide.

The carbonate ion generated in the cathode 1230 may be supplied to the anode 1290.

The cathode 1230 may discharge the cathode exhaust gas after generating the carbonate ion.

The cathode exhaust gas may partially be introduced into the cathode 1230 via the cathode exhaust gas-anode fuel heat-exchanging apparatus 1240 and the cathode exhaust gas-circulation line heat-exchanging apparatus 1250.

The cathode exhaust gas which has not been introduced in the cathode 1230 may be discharged to the atmosphere 1410.

The anode 1290 may generate hydrogen using methane and water which are supplied from the fuel mixing unit 1280 via the cathode exhaust gas-anode fuel heat-exchanger 1240.

The anode 1290 may generate electrons using the hydrogen generated in the anode 1290 and the carbonate ion supplied from the cathode 1230.

The electrons may generate electric energy while moving along an external circuit (not illustrated).

The anode 1290 may discharge the anode exhaust gas, which contains vapor (or steam), carbon dioxide, unreacted hydrogen, and carbon monoxide, while generating the electrons.

Most of the anode exhaust gas may be introduced into the gas heat-exchanging unit 2310 via the first anode exhaust gas-cathode fuel heat-exchanging apparatus 2210, the water-gas shift reaction unit 2220, the second anode exhaust gas-cathode fuel heat-exchanging apparatus 2230 and the compressor 1630, and also the rest of the anode exhaust gas may be introduced into the cathode 1230.

Here, while the anode exhaust gas introduced in the gas heat-exchanging unit 2310 flows through the water-gas shift reaction unit 2220, the carbon monoxide contained in the anode exhaust gas may be converted into hydrogen and carbon dioxide.

Therefore, the anode exhaust gas introduced in the gas heat-exchanging unit 2310 may contain vapor, carbon dioxide and hydrogen.

The anode exhaust gas introduced in the gas heat-exchanging unit 2310 may be produced into water, hydrogen and liquefied carbon dioxide, while passing through the first gas heat-exchanging unit 2320, the first separator 2330, the compressor 1640, the second gas heat-exchanging unit 2340 and the second separator 2350.

In more detail, the anode exhaust gas introduced in the gas heat-exchanging unit 2310 may be introduced into the fourth passage 2324.

The anode exhaust gas introduced in the fourth passage 2324 may be cooled by natural gas which passing through the fourth chamber 2322 via the second gas heat-exchanging unit 2340.

The vapor contained in the anode exhaust gas which passes through the fourth passage 2324 may be liquefied into water.

The anode exhaust gas passed through the fourth passage 2324 may be introduced into the first separator 2330.

The anode exhaust gas introduced in the first separator 2330 may be processed such that the water can be separated from hydrogen and carbon dioxide.

The water separated in the first separator 2330, for example, may be collected in the water storage space 1930. The water stored in the water storage space 1930 may be supplied to the water supply unit 1420 for reuse.

The hydrogen and the carbon dioxide separated in the first separator 2330 may be introduced into the fifth passage 2344.

The anode exhaust gas introduced in the fifth passage 2344 may be cooled by natural gas which passes through the fifth chamber 2342 via the cold box 1320.

The carbon dioxide contained in the anode exhaust gas which passes through the fifth passage 2344 may be liquefied.

The anode exhaust gas passed through the fifth passage 2344 may be introduced into the second separator 2350.

The anode exhaust gas introduced in the second separator 2350 may be processed such that the liquefied carbon dioxide can be separated from the hydrogen.

The liquefied carbon dioxide separated in the second separator 2350 may be collected in a liquefied carbon dioxide storage space 1940.

The hydrogen separated in the second separator 2350 may be collected in the hydrogen storage space 1950.

Meanwhile, a natural gas supply line through which the natural gas is supplied from the natural gas station 1100 into the natural gas consumer 1160 may be divided into two lines.

Natural gas which is supplied through one of the two divided lines may be vaporized by absorbing heat from the air introduced into the air separating unit 1380 through the cold box 1320, and absorbing heat from the anode exhaust gas while sequentially passing through the second gas heat-exchanging unit 2340 and the first gas heat-exchanging unit 2320.

Natural gas supplied through the other line of the two divided lines may be vaporized by absorbing heat from the circulation line 1260 through the submerged combustion vaporizer (SMV) 1270.

The vaporized natural gas may be supplied to the natural gas consumer 1160.

Here, the fuel cell using the natural gas according to the second exemplary embodiment may generate oxygen, which is introduced into the fuel cell 2200, by using cold energy of the natural gas supplied from the natural gas station 1100. This may result in a reduction of electric energy which is consumed for the oxygen production.

Also, the fuel cell using the natural gas according to the second exemplary embodiment may produce by-products, such as water, hydrogen and liquefied carbon dioxide, from fuel cell exhaust gas using the cold energy of the natural gas, which may result in improvement of profitability by virtue of those by-products.

Also, an amount of exhaust gas discharged from the fuel cell can be reduced so as to prevent environmental pollution.

In addition, energy which is required for operating devices or facilities to reduce the amount of exhaust gas discharged from fuel cell may be reduced.

The fuel cell using the natural gas according to the second exemplary embodiment may also use the carbon dioxide, which is discharged from the anode 1290 while generating the electrons, to generate the carbonate ion. Accordingly, an amount of exhaust gas discharged from fuel cell can be reduced so as to prevent the environmental pollution.

In more detail, the carbon dioxide discharged from the anode 1290 may be reduced in a manner of being introduced in the cathode 1230 and converted into the carbonate ion.

Also, the carbon dioxide, which has been discharged from the anode 1290 and introduced into the cathode 1230 but discharged without being converted into the carbonate ion, may partially be reintroduced into the cathode 1230 and converted into the carbonate ion. This may result in a reduction of the carbon dioxide.

The fuel cell using the natural gas according to the second exemplary embodiment may also vaporize the natural gas supplied to the natural gas consumer 1160, by use of heat of air introduced from the atmosphere 1410 and heat of the anode exhaust gas introduced into the gas heat-exchanging unit 2310.

Accordingly, an amount of seawater of low temperature, which is discharged into the ocean after vaporizing the natural gas, can be reduced, thereby preventing a bad influence caused due to the seawater of low temperature.

Figure 5:
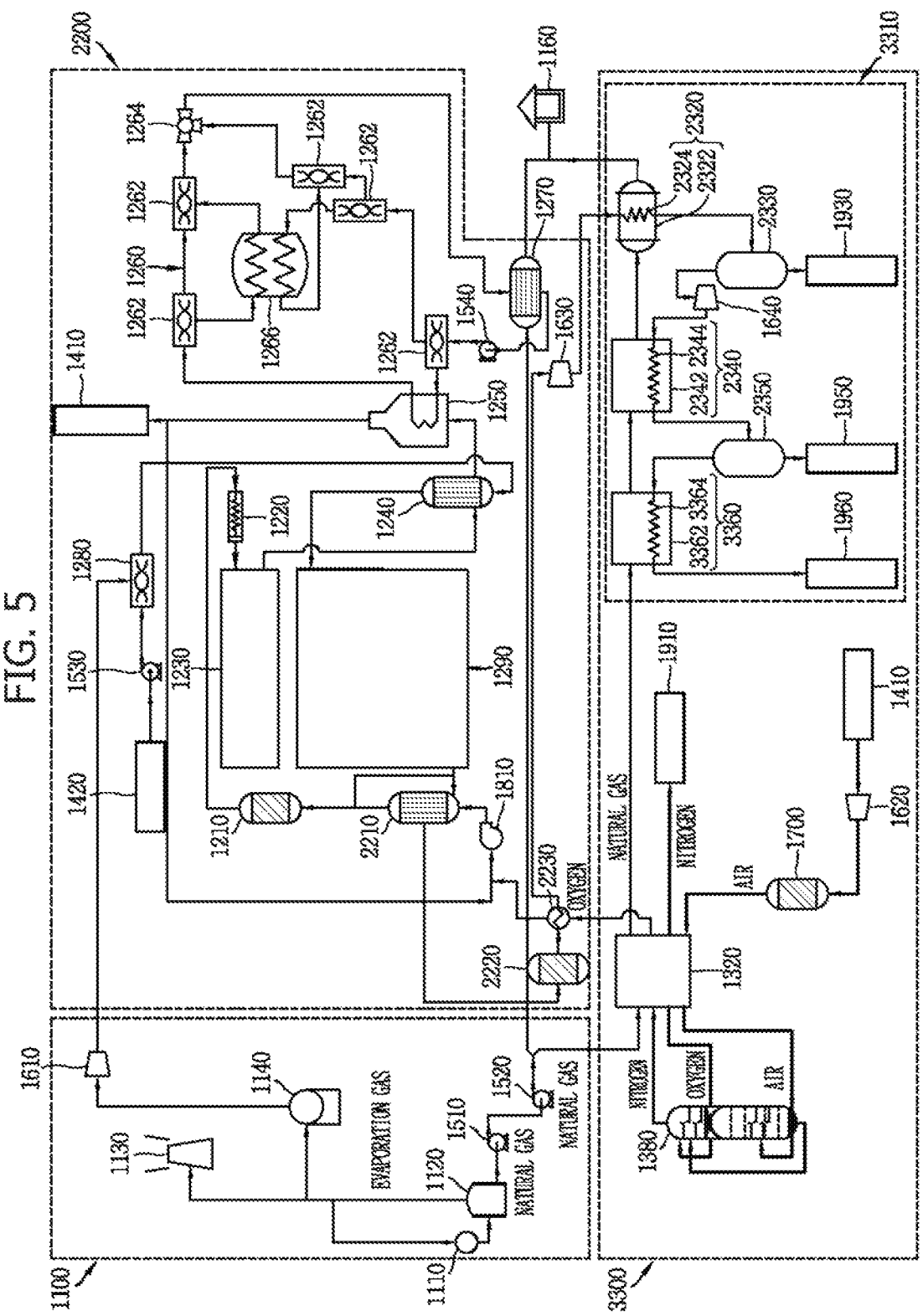
FIG. 5 is a block diagram illustrating a fuel cell system using natural gas in accordance with a third exemplary embodiment disclosed herein.

FIG. 5 is a block diagram illustrating a fuel cell using natural gas in accordance with a third exemplary embodiment disclosed herein.

As illustrated in FIG. 5, a fuel cell system using natural gas according to a third exemplary embodiment may include a natural gas station 1100 which supplies natural gas to a natural gas consumer 1160, a fuel cell 2200 having a cathode 1230 and an anode 1290, and a cryogenic heat-exchanging apparatus 3300 which heat-exchanges the natural gas supplied from the natural gas station 1100 with introduced air and exhaust gas of the fuel cell 2200.

Unlike, the fuel cell using natural gas according to the third exemplary embodiment is the same as the fuel cell according to the second exemplary embodiment, except for including a third gas heat-exchanging unit 3360 which heat-exchanges natural gas passed through the cold box 1320 with anode exhaust gas passed through the second separator 2350.

The third gas heat-exchanging unit 3360 may heat the natural gas passed through the cold box 1320 and solidify liquefied carbon dioxide of the anode exhaust gas passed through the second separator 2350 into dry ice, in the heat-exchanging manner.

The third gas heat-exchanging unit 3360 may include a sixth chamber 3362 (a natural gas chamber of the third gas heat-exchanging unit) through which the natural gas passed through the cold box 1320 passes.

The third gas heat-exchanging unit 3360 may include a sixth passage 3364 (an anode exhaust gas passage within the natural gas chamber of the third gas heat-exchanging unit), which is disposed within the sixth chamber 3362 to be heat-exchangeable, and through which the liquefied carbon dioxide of the anode exhaust gas passed through the second separator 2350 passes.

Here, the third gas heat-exchanging unit 3360 may be configured such that the anode exhaust gas passed through the second separator 2350 passes through the sixth chamber 3362 and the natural gas passed through the cold box 1320 passes through the sixth passage 3364.

Detailed description of other same/like components will be omitted to avoid redundant explanation.

Hereinafter, operation effects of the fuel cell using the natural gas according to the third exemplary embodiment will be described with reference to FIG. 5.

The operation effects of the fuel cell using the natural gas according to the third exemplary embodiment are the same as those of the second exemplary embodiment, except for the processing of the liquefied carbon dioxide separated in the second separator 2350.

That is, the anode exhaust gas introduced into the gas heat-exchanging unit 3310 may be produced into water, hydrogen and dry ice, while passing through the first gas heat-exchanging unit 2320, the first separator 2330, the compressor 1640, the second gas heat-exchanging unit 2340, the second separator 2350 and the third gas heat-exchanging unit 3360.

In more detail, the anode exhaust gas introduced into the gas heat-exchanging unit 3310 may be introduced into the fourth passage 2324.

The anode exhaust gas introduced in the fourth passage 2324 may be cooled by the natural gas which passes through the fourth chamber 2322 via the second gas heat-exchanging unit 2340.

Vapor contained in the anode exhaust gas which passes through the fourth passage 2324 may be liquefied into water.

The anode exhaust gas passed through the fourth passage 2324 may be introduced into the first separator 2330.

The anode exhaust gas introduced in the first separator 2330 may be processed such that the water can be separated from the hydrogen and the carbon dioxide.

The water separated in the first separator 2330, for example, may be collected in the water storage space 1930. The water stored in the water storage space 1930 may be supplied to the water supply unit 1420 for reuse.

The hydrogen and carbon dioxide separated in the first separator 2330 may be introduced into the fifth passage 2344.

The anode exhaust gas introduced in the fifth passage 2344 may be cooled by natural gas which passes through the fifth chamber 2342 via the third gas heat-exchanging unit 3360.

The carbon dioxide contained in the anode exhaust gas which passes through the fifth passage 2344 may be liquefied.

The anode exhaust gas passed through the fifth passage 2344 may be introduced into the second separator 2350.

The anode exhaust gas introduced in the second separator 2350 may be processed such that the liquefied carbon dioxide can be separated from the hydrogen.

The hydrogen separated in the second separator 2350 may be collected in the hydrogen storage space 1950.

The liquefied carbon dioxide separated in the second separator 2350 may be introduced into the sixth passage 3364.

The liquefied carbon dioxide of the anode exhaust gas introduced in the sixth passage 3364 may be cooled by natural gas which passes through the sixth chamber 3362 via the cold box 1320.

The liquefied carbon dioxide of the anode exhaust gas which passes through the sixth passage 3364 may be solidified into dry ice.

The dry ice may be collected in a dry ice storage space 1960.

Meanwhile, a natural gas supply line through which the natural gas is supplied from the natural gas station 110 into the natural gas consumer 1160 may be divided into two lines.

Natural gas supplied through one of the two divided lines may be vaporized by absorbing heat from air introduced into the air separating unit 1380 through the cold box 1320, and absorbing heat from the anode exhaust gas, which sequentially passes through the third gas heat-exchanging unit 3360, the second gas heat-exchanging unit 2340 and the first gas heat-exchanging unit 2320.

Natural gas supplied through the other of the two divided lines may be vaporized by absorbing heat from the circulation line 1260 through the SMV 1270.

The vaporized natural gas may be supplied to the natural gas consumer 1160.

Detailed description of other same operation effects will be omitted to avoid redundant explanation.

Here, the fuel cell using the natural gas according to the third exemplary embodiment may produce oxygen which is introduced into the fuel cell 2200, by using cold energy of natural gas supplied from the natural gas station 1100.

This may result in a reduction of electric energy which is consumed for the oxygen production.

Also, the fuel cell using the natural gas according to the third exemplary embodiment may produce by-products, such as water, hydrogen and dry ice, from fuel cell exhaust gas using the cold energy of the natural gas.

This may result in improvement of profitability by virtue of those by-products.

Also, an amount of exhaust gas discharged from the fuel cell can be reduced so as to prevent environmental pollution.

In addition, energy which is required for operating devices or facilities to reduce the amount of exhaust gas discharged from fuel cell may be reduced.

The fuel cell using the natural gas according to the third exemplary embodiment may also use the carbon dioxide, which is discharged while generating the electrons in the anode 1290, to generate the carbonate ion. Accordingly, an amount of carbon dioxide discharged from the fuel cell can be reduced, thereby preventing the environmental pollution.

In more detail, the carbon dioxide discharged from the anode 1290 may be reduced in a manner of being introduced into the cathode 1230 and converted into the carbonate ion.

Also, carbon dioxide, which has been introduced from the anode 1290 into the cathode 1230 but discharged without being converted into the carbonate ion, may partially be reintroduced into the cathode 1230 and converted into the carbonate ion, thereby being reduced.

The fuel cell using the natural gas according to the third exemplary embodiment may also vaporize the natural gas supplied to the natural gas consumer 1160, by use of heat of air introduced from the atmosphere 1410 and heat of the anode exhaust gas introduced into the gas heat-exchanging unit 3310.

Accordingly, an amount of seawater of low temperature, which is discharged into the sea after vaporizing the natural gas, can be reduced, thereby preventing a bad influence caused due to the seawater of low temperature.

Figure 6:
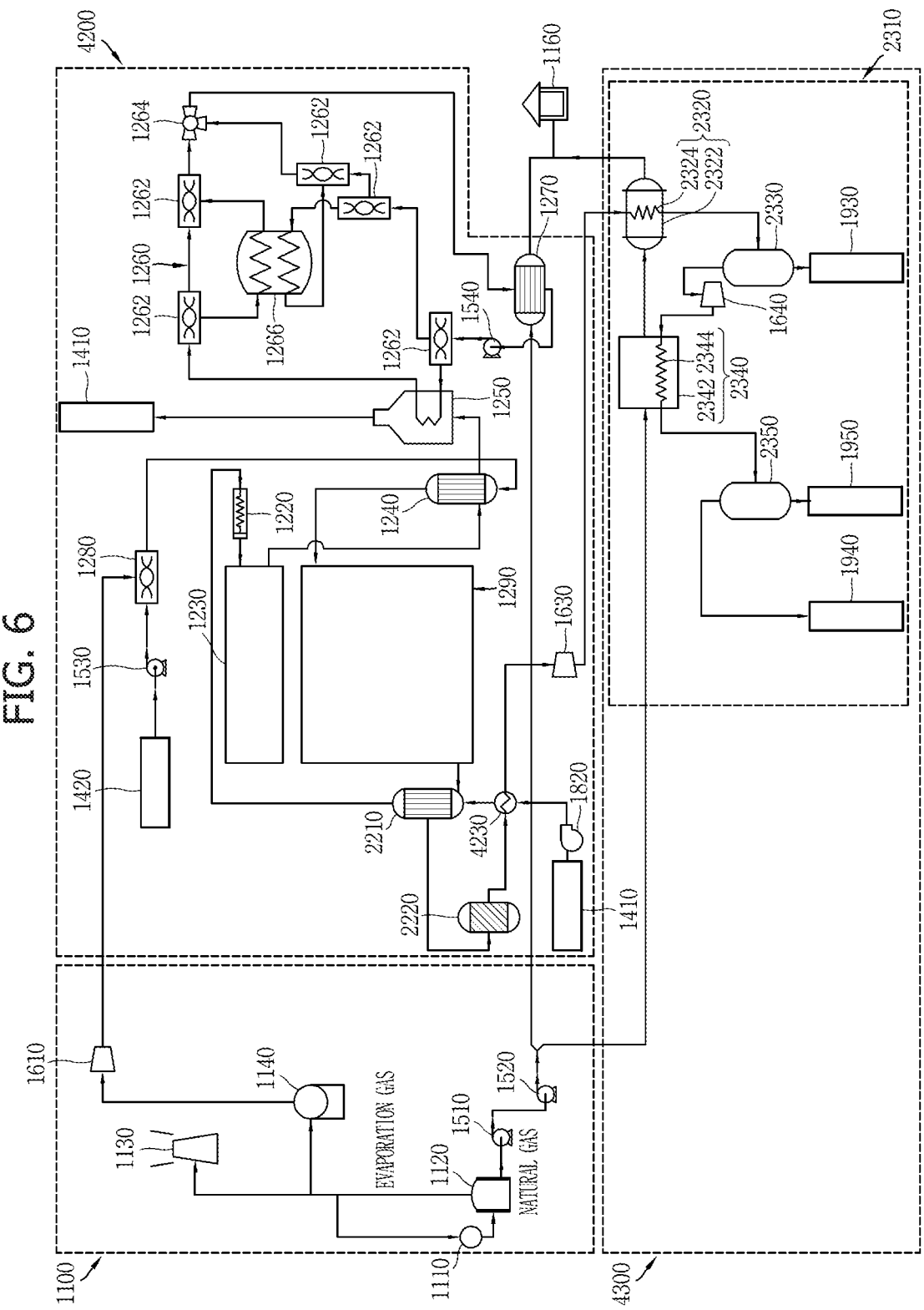
FIG. 6 is a block diagram illustrating a fuel cell system using natural gas in accordance with a fourth exemplary embodiment disclosed herein.

FIG. 6 is a block diagram illustrating a fuel cell using natural gas in accordance with a fourth exemplary embodiment disclosed herein.

As illustrated in FIG. 6, a fuel cell system using natural gas according to a third exemplary embodiment may include a natural gas station 1100 which supplies natural gas to a natural gas consumer 1160, a fuel cell 4200 having a cathode 1230 and an anode 1290, and a cryogenic heat-exchanging apparatus 4300 which heat-exchanges the natural gas supplied from the natural gas station 1100 with exhaust gas of the fuel cell 4200.

The fuel cell using the natural gas according to the fourth exemplary embodiment may be different from the fuel cell according to the second exemplary embodiment, in view of a cathode fuel line of the fuel cell 4200.

The cathode fuel line may be configured to supply oxygen and carbon dioxide from the atmosphere 1410 to the cathode 1230.

The cathode fuel line which is disposed between the atmosphere 1410 and the cathode 1230 may include a blower 1820 which presses and supplies the oxygen and carbon dioxide supplied from the atmosphere 1410, and a first anode exhaust gas-cathode fuel heat-exchanging apparatus 2210 and a second anode exhaust gas-cathode fuel heat-exchanging apparatus 4230 which heat the oxygen and carbon dioxide supplied from the blower 1820 using waste heat of the anode exhaust gas.

Here, the cathode fuel line may not be provided with the air separating unit 1380 and the cold box 1320.

The cathode fuel line may be configured such that the cathode exhaust gas cannot recirculate into the cathode 1230.

The cathode fuel line may also be configured such that the anode exhaust gas cannot be introduced into the cathode 1230 but introduced into the gas heat-exchanging unit 2310.

Detailed description of other same/like components will be omitted to avoid redundant explanation.

Hereinafter, operation effects of the fuel cell using the natural gas according to the fourth exemplary embodiment will be described with reference to FIG. 6.

First, the oxygen and carbon dioxide introduced from the atmosphere 1410 may pass through the second anode exhaust gas-cathode fuel heat-exchanging apparatus 4230.

The oxygen and carbon dioxide which passes through the second anode exhaust gas-cathode fuel heat-exchanging apparatus 4230 may be heated by the anode exhaust gas discharged from the water-gas shift reaction unit 2220.

The oxygen and carbon dioxide passed through the second anode exhaust gas-cathode fuel heat-exchanging apparatus 4230 may pass through the first anode exhaust gas-cathode fuel heat-exchanging apparatus 2210.

The oxygen and carbon dioxide which passes through the first anode exhaust gas-cathode fuel heat-exchanging apparatus 2210 may be further heated by the anode exhaust gas which is discharged from the anode 1290.

The oxygen and carbon dioxide passed through the first anode exhaust gas-cathode fuel heat-exchanging apparatus 2210 may be further heated by the heater 1220.

The oxygen and carbon dioxide further heated by the heater 1220 may be introduced into the cathode 1230.

The cathode 1230 may generate the carbonate ion from the introduced oxygen and carbon dioxide.

The carbonate ion generated in the cathode 1230 may be supplied to the anode 1290.

The cathode 1230 may discharge the cathode exhaust gas after generating the carbonate ion.

The cathode exhaust gas may be discharged to the atmosphere 1410 via the cathode exhaust gas-anode fuel heat-exchanging apparatus 1240 and the cathode exhaust gas-circulation line heat-exchanging apparatus 1250.

The anode 1290 may generate hydrogen using methane and water, which are supplied from the fuel mixing unit 1280 through the cathode exhaust gas-anode fuel heat-exchanging apparatus 1240.

The anode 1290 may generate electrons using the hydrogen generated in the anode 1290 and the carbonate ion supplied from the cathode 1230.

The electrons may generate electric energy while passing through an external circuit (not illustrated).

The anode 1290 may discharge the anode exhaust gas, which contains vapor, carbon dioxide, unreacted hydrogen and carbon monoxide, while generating the electrons.

Most of the anode exhaust gas may be introduced into the gas heat-exchanging unit 2310, sequentially via the first anode exhaust gas-cathode fuel heat-exchanging apparatus 2210, the water-gas shift reaction unit 2220, the second anode exhaust gas-cathode fuel heat-exchanging apparatus 4230, and the compressor 1630.

Here, while the anode exhaust gas which is introduced into the gas heat-exchanging unit 2310 passes through the water-gas shift reaction unit 2220, the carbon monoxide of the anode exhaust gas may be converted into hydrogen and carbon dioxide.

Therefore, the anode exhaust gas introduced in the gas heat-exchanging unit 2310 may contain vapor, carbon dioxide and hydrogen.

The anode exhaust gas introduced in the gas heat-exchanging unit 2310 may be produced into water, hydrogen and liquefied carbon dioxide, while passing through the first gas heat-exchanging unit 2320, the first separator 2330, the compressor 1640, the second gas heat-exchanging unit 2340, and the second separator 2340.

In more detail, the anode exhaust gas which is introduced into the gas heat-exchanging unit 2310 may be introduced into the fourth passage 2324.

The anode exhaust gas introduced in the fourth passage 2324 may be cooled by natural gas which passes through the fourth chamber 2322 via the second gas heat-exchanging unit 2340.

The vapor contained in the anode exhaust gas which passes through the fourth passage 2324 may be liquefied into water.

The anode exhaust gas passed through the fourth passage 2324 may be introduced into the first separator 2330.

The anode exhaust gas introduced in the first separator 2330 may be processed such that the water can be separated from hydrogen and carbon dioxide.

The water separated in the first separator 2330, for example, may be collected in the water storage space 1930. The water stored in the water storage space 1930 may be supplied to the water supply unit 1420 for reuse.

The hydrogen and carbon dioxide separated in the first separator 2330 may be introduced into the fifth passage 2344.

The anode exhaust gas introduced in the fifth passage 2344 may be cooled by liquefied natural gas which is supplied from the natural gas station 110 and passes through the fifth chamber 2342.

The carbon dioxide contained in the anode exhaust gas which passes through the fifth passage 2344 may be liquefied.

The anode exhaust gas passed through the fifth passage 2344 may be introduced into the second separator 2350.

The anode exhaust gas introduced in the second separator 2350 may be processed such that the liquefied carbon dioxide can be separated from hydrogen.

The liquefied carbon dioxide separated in the second separator 2350 may be collected in the liquefied carbon dioxide storage space 1940.

The hydrogen separated in the second separator 2350 may be collected in the hydrogen storage space 1950.

Meanwhile, a natural gas supply line through which the natural gas is supplied from the natural gas station 110 to the natural gas consumer 1160 may be divided into two lines.

Natural gas supplied through one of the two divided lines may be vaporized by absorbing heat from the anode exhaust gas while sequentially passing through the second gas heat-exchanging unit 2340 and the first gas heat-exchanging unit 2320.

Natural gas supplied through the other of the two divided lines may be vaporized by absorbing heat from the circulation line 1260 while passing through the submerged combustion vaporizer (SMV) 1270.

The vaporized natural gas may be supplied to the natural gas consumer 1160.

Here, the fuel cell using the natural gas according to the fourth exemplary embodiment may produce by-products, such as water, hydrogen and liquefied carbon dioxide, from fuel cell exhaust gas using the cold energy of the natural gas.

This may result in improvement of profitability by virtue of those by-products.

Also, an amount of exhaust gas discharged from the fuel cell can be reduced so as to prevent environmental pollution.

In addition, energy which is required for operating devices or facilities to reduce the amount of exhaust gas discharged from the fuel cell may be reduced.

The fuel cell using the natural gas according to the fourth exemplary embodiment may convert the carbon dioxide contained in the atmosphere 1410 into the carbonate ion, thereby reducing carbon dioxide which causes global warming.

The fuel cell using the natural gas according to the fourth exemplary embodiment may vaporize the natural gas supplied to the natural gas consumer 1160 using heat of the anode exhaust gas introduced into the gas heat-exchanging unit 2310.

Accordingly, an amount of seawater of low temperature, which is discharged into the sea after vaporizing the natural gas, can be reduced, thereby preventing a bad influence caused due to the seawater of low temperature.

Figure 7:
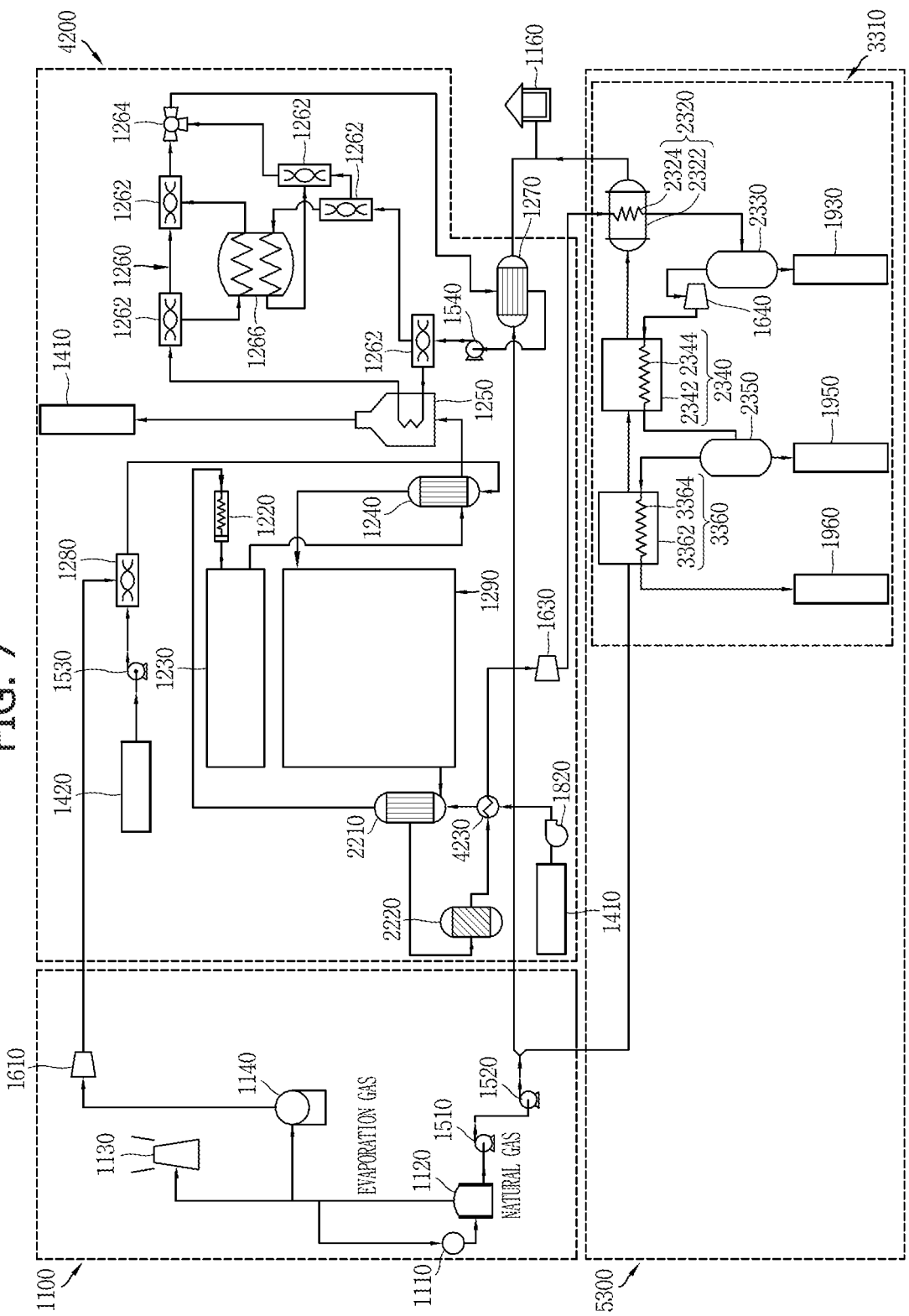
FIG. 7 is a block diagram illustrating a fuel cell system using natural gas in accordance with a fifth exemplary embodiment disclosed herein.

FIG. 7 is a block diagram illustrating a fuel cell using natural gas in accordance with a fifth exemplary embodiment disclosed herein.

As illustrated in FIG. 7, a fuel cell system using natural gas according to a fifth exemplary embodiment may include a natural gas station 1100 which supplies natural gas to a natural gas consumer 1160, a fuel cell 4200 having a cathode 1230 and an anode 1290, and a cryogenic heat-exchanging apparatus 5300 which heat-exchanges the natural gas supplied from the natural gas station 110 with exhaust gas of the fuel cell 4200.

The fuel cell using the natural gas according to the fifth exemplary embodiment is from the same as the fuel cell of the fourth exemplary embodiment, except for employing a third gas heat-exchanging unit 3360 which heat-exchanges liquefied natural gas supplied from the natural gas station 110 with anode exhaust gas passed through the second separator 2350.

The third gas heat-exchanging unit 3360 may heat the liquefied natural gas supplied from the natural gas station 1100, and solidify liquefied carbon dioxide of the anode exhaust gas passed through the second separator 2350 into dry ice, in the heat-exchanging manner.

The third gas heat-exchanging unit 3360 may include a sixth chamber 3362 through which the liquefied natural gas supplied from the natural gas station 1100 passes.

The third gas heat-exchanging unit 3360 may include a sixth passage 3364, which is disposed within the sixth chamber 3362 to be heat-exchangeable, and through which the liquefied carbon dioxide contained in the anode exhaust gas passed through the second separator 2350 passes.

Here, the third gas heat-exchanging unit 3360 may be configured such that the liquefied carbon dioxide of the anode exhaust gas passed through the second separator 2350 passes through the sixth chamber 3362 and the liquefied natural gas supplied from the natural gas station 110 passes through the sixth passage 3364.

Detailed description of the other same/like components will be omitted to avoid redundant explanation.

Hereinafter, operation effects of the fuel cell using the natural gas according to the fifth exemplary embodiment will be described with reference to FIG. 7.

The operation effects of the fuel cell using the natural gas according to the fifth exemplary embodiment are the same as those provided in the fourth exemplary embodiment, except for the processing of the liquefied carbon dioxide separated in the second separator 2350.

That is, the anode exhaust gas introduced into the gas heat-exchanging unit 3310 may be produced into water, hydrogen and dry ice, while passing through the first gas heat-exchanging unit 2320, the first separator 2330, the compressor 1640, the second gas heat-exchanging unit 2340, the second separator 2350, and the third gas heat-exchanging unit 3360.

In more detail, the anode exhaust gas introduced into the gas heat-exchanging unit 3310 may be introduced into the fourth passage 2324.

The anode exhaust gas introduced in the fourth passage 2324 may be cooled by natural gas which passes through the fourth chamber 2322 via the second gas heat-exchanging unit 2340.

Vapor contained in the anode exhaust gas which passes through the fourth passage 2324 may be liquefied into water.

The anode exhaust gas passed through the fourth passage 2324 may be introduced into the first separator 2330.

The anode exhaust gas introduced in the first separator 2330 may be processed such that the water can be separated from hydrogen and carbon dioxide.

The water separated in the first separator 2330, for example, may be collected in the water storage space 1930. The water stored in the water storage space 1930 may be supplied to the water supply unit 1420 for reuse.

The hydrogen and carbon dioxide separated in the first separator 2330 may be introduced into the fifth passage 2344.

The anode exhaust gas introduced in the fifth passage 2344 may be cooled by natural gas which passes through the fifth chamber 2342 via the third gas heat-exchanging unit 3360.

The carbon dioxide contained in the anode exhaust gas which passes through the fifth passage 2344 may be liquefied.

The anode exhaust gas passed through the fifth passage 2344 may be introduced into the second separator 2350.

The anode exhaust gas introduced in the second separator 2350 may be processed such that the liquefied carbon dioxide can be separated from hydrogen.

The hydrogen separated in the second separator 2350 may be collected in the hydrogen storage space 1950.

The liquefied carbon dioxide separated in the second separator 2350 may be introduced into the sixth passage 3364.

The liquefied carbon dioxide contained in the anode exhaust gas introduced in the sixth passage 3364 may be cooled by natural gas which is supplied from the natural gas station 1100 and passes through the sixth chamber 3362.

The liquefied carbon dioxide contained in the anode exhaust gas which passes through the sixth passage 3364 may be solidified into dry ice.

The dry ice may be collected in the dry ice storage space 1960.

Meanwhile, a natural gas supply line through which the natural gas is supplied from the natural gas station 1100 into the natural gas consumer 1160 may be divided into two lines.

Natural gas supplied through one of the two divided lines may be vaporized by absorbing heat from the anode exhaust gas, while sequentially passing through the third gas heat-exchanging unit 3360, the second gas heat-exchanging unit 2340 and the first gas heat-exchanging unit 2320.

Natural gas supplied through the other of the two divided lines may be vaporized by absorbing heat from the circulation line 1260 through the submerged combustion vaporizer (SMV) 1270.

The vaporized natural gas may be supplied to the natural gas consumer 1160.

Detailed description of the same operation effects will be omitted to avoid redundant explanation.

Here, the fuel cell using the natural gas according to the fifth exemplary embodiment may produce by-products, such as water, hydrogen and dry ice, from fuel cell exhaust gas using cold energy of the natural gas.

This may result in improvement of profitability by virtue of those by-products.

Also, an amount of exhaust gas discharged from the fuel cell can be reduced so as to prevent environmental pollution.

In addition, energy which is required for operating devices or facilities to reduce the amount of exhaust gas discharged from the fuel cell may be reduced.

The fuel cell using the natural gas according to the fifth exemplary embodiment may convert the carbon dioxide contained in the atmosphere 1410 into the carbonate ion, thereby reducing carbon dioxide which causes global warming.

The fuel cell using the natural gas according to the fifth exemplary embodiment may vaporize the natural gas supplied to the natural gas consumer 1160 using heat of the anode exhaust gas introduced into the gas heat-exchanging unit 2310.

Accordingly, an amount of seawater of low temperature, which is discharged into the ocean after vaporizing the natural gas, can be reduced, thereby preventing a bad influence caused due to the seawater of low temperature.

Figure 8:
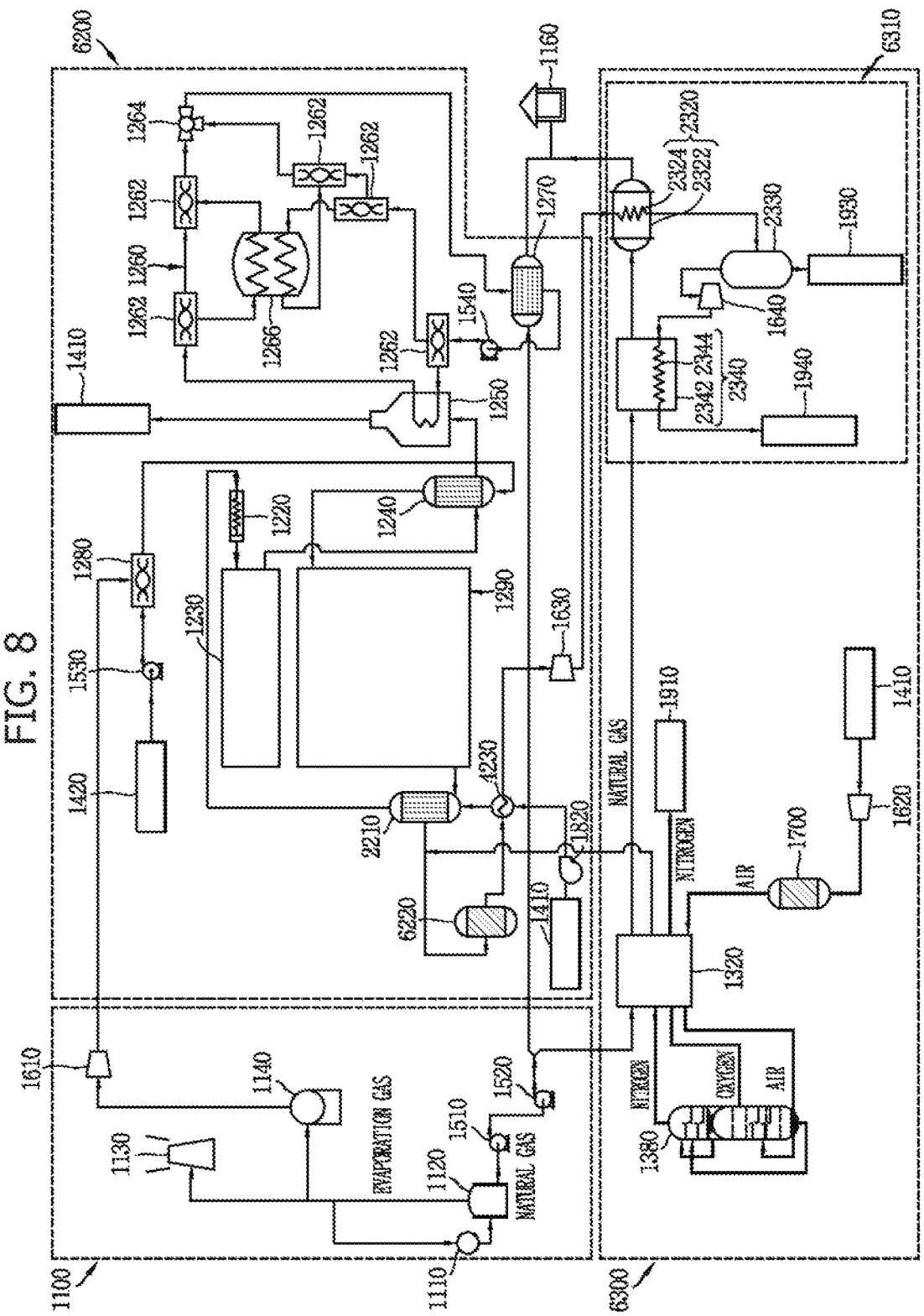
FIG. 8 is a block diagram illustrating a fuel cell system using natural gas in accordance with a sixth exemplary embodiment disclosed herein.

FIG. 8 is a block diagram illustrating a fuel cell using natural gas in accordance with a sixth exemplary embodiment disclosed herein.

As illustrated in FIG. 8, a fuel cell system using natural gas according to a sixth exemplary embodiment may include a natural gas station 1100 which supplies natural gas to a natural gas consumer 1160, a fuel cell 6200 having a cathode 1230 and an anode 1290, and a cryogenic heat-exchanging apparatus 6300 which heat-exchange the natural gas supplied from the natural gas station 110 with introduced air and exhaust gas of the fuel cell 6200.

The fuel cell using the natural gas according to the sixth exemplary embodiment is the same as the fuel cell according to the fourth exemplary embodiment, except for an anode exhaust gas discharge line of the fuel cell 6200.

The anode exhaust gas discharge line may include an oxidation catalyzing unit 6220 which oxidizes hydrogen and carbon monoxide of the anode exhaust gas into vapor and carbon dioxide, and the air separating unit 1380 and the cold box 1320 which supply oxygen required for the oxidation to the oxidation catalyzing unit 6220.

The air separating unit 1380 and the cold box 1320 are the same as those in the first to third exemplary embodiments, except for supplying the generated oxygen to the oxidation catalyzing unit 6220. Thus, detailed description thereof will be omitted.

Here, the fuel cell using the natural gas according to the fourth exemplary embodiment may produce the water, liquefied carbon dioxide and hydrogen from the anode exhaust gas.

To this end, the fuel cell using the natural gas according to the fourth exemplary embodiment may be provided with the water-gas shift reaction unit 2220 which converts the carbon monoxide contained in the anode exhaust gas into hydrogen and carbon dioxide, and the second separator 2350 which separates the liquefied carbon dioxide and the hydrogen.

On the other hand, this exemplary embodiment may illustrate that the fuel cell using the natural gas produces water and liquefied carbon dioxide from the anode exhaust gas.

That is, this exemplary embodiment may not generate the hydrogen from the anode exhaust gas.

To this end, the fuel cell using the natural gas according to this exemplary embodiment may include the oxidation catalyzing unit 6220, the air separating unit 1380 and the cold box 1320 for removing the hydrogen and the carbon monoxide inform the anode exhaust gas.

Also, the fuel cell according to this exemplary embodiment may not be provided with the second separator 2350 because of no need of the separation between the liquefied carbon dioxide and the hydrogen, contained in the anode exhaust gas.

Detailed description of other same/like components will be omitted to avoid redundant explanation.

Hereinafter, operation effects of the fuel cell using the natural gas according to the sixth exemplary embodiment will be described with reference to FIG. 8.

The cathode 1230 may generate carbonate ion from oxygen and the carbon dioxide introduced from the atmosphere 1410.

The anode 1290 may generate hydrogen from methane and water introduced from the fuel mixing unit 1280.

The anode 1290 may also generate electrons from the hydrogen generated in the anode 1290 and the carbonate ion supplied from the cathode 1230, and discharge the anode exhaust gas.

Detailed description thereof is the same as the fourth exemplary embodiment, so as to be omitted.

The anode exhaust gas may be introduced into a gas heat-exchanging unit 6310 sequentially via the first anode exhaust gas-cathode fuel heat-exchanging apparatus 2210, the oxidation catalyzing unit 6220, the second anode exhaust gas-cathode fuel heat-exchanging apparatus 4230 and the compressor 1630.

Here, while the anode exhaust gas introduced in the gas heat-exchanging unit 6310 passes through the oxidation catalyzing unit 6220, the hydrogen and the carbon monoxide contained in the anode exhaust gas may be converted into vapor and carbon dioxide.

Therefore, the anode exhaust gas introduced in the gas heat-exchanging unit 6310 may contain the vapor and the carbon dioxide.

The anode exhaust gas introduced in the gas heat-exchanging unit 6310 may be produced into water and liquefied carbon dioxide, while passing through the first gas heat-exchanging unit 2320, the first separator 2330, the compressor 1640, and the second gas heat-exchanging unit 2340.

In more detail, the anode exhaust gas introduced in the gas heat-exchanging unit 6310 may be introduced into the fourth passage 2324.

The anode exhaust gas introduced in the fourth passage 2324 may be cooled by natural gas which passes through the fourth chamber 2322 via the second gas heat-exchanging unit 2340.

The vapor contained in the anode exhaust gas which passes through the fourth passage 2324 may be liquefied into water.

The anode exhaust gas passed through the fourth passage 2324 may be introduced into the first separator 2330.

The anode exhaust gas introduced in the first separator 2330 may be processed such that the water can be separated from the carbon dioxide.

The water separated in the first separator 2330 may be collected in the water storage space 1930. The water stored in the water storage space 1930 may be supplied to the water supply unit 1420 for reuse.

The carbon dioxide separated in the first separator 2330 may be introduced into the fifth passage 2344.

The anode exhaust gas introduced in the fifth passage 2344 may be cooled by natural gas which passes through the fifth chamber 2342 via the cold box 1320.

The carbon dioxide contained in the anode exhaust gas which passes through the fifth passage 2344 may be liquefied.

The liquefied carbon dioxide contained in the anode exhaust gas passed through the fifth passage 2344 may be collected in the liquefied carbon dioxide storage space 1940.

Meanwhile, a natural gas supply line through which the natural gas is supplied from the natural gas station 1100 into the natural gas consumer 1160 may be divided into two lines.

Natural gas supplied through one of the two divided lines may be vaporized by absorbing heat from air introduced into the air separating unit 1380 through the cold box 1320, and absorbing heat from the anode exhaust gas which sequentially passing through the second gas heat-exchanging unit 2340 and the first gas heat-exchanging unit 2320.

Natural gas supplied through the other of the two divided lines may be vaporized by absorbing heat from the circulation line 1260 through the SMV 1270.

The vaporized natural gas may be supplied to the natural gas consumer 1160.

Here, the fuel cell using the natural gas according to the sixth exemplary embodiment may produce oxygen, which is introduced into the fuel cell 6200, using cold energy of the natural gas supplied from the natural gas station 1100.

This may result in reduction of electric energy which is consumed for the oxygen production.

Also, the fuel cell using the natural gas according to the sixth exemplary embodiment may produce by-products, such as water and liquefied carbon dioxide, from fuel cell exhaust gas using cold energy of the natural gas.

This may result in improvement of profitability by virtue of those by-products.

Also, an amount of exhaust gas discharged from the fuel cell can be reduced so as to prevent environmental pollution.

In addition, energy which is required for operating devices or facilities to reduce the amount of exhaust gas discharged from the fuel cell may be reduced.

The fuel cell using the natural gas according to the sixth exemplary embodiment may convert the carbon dioxide contained in the atmosphere 1410 into the carbonate ion, thereby reducing carbon dioxide which causes global warming.

The fuel cell using the natural gas according to the sixth exemplary embodiment may vaporize the natural gas supplied to the natural gas consumer 1160 using heat of air introduced from the atmosphere 1410 and heat of the anode exhaust gas introduced into the gas heat-exchanging unit 2310.

Accordingly, an amount of seawater of low temperature, which is discharged into the ocean after vaporizing the natural gas, can be reduced, thereby preventing a bad influence caused due to the seawater of low temperature.

Figure 9:
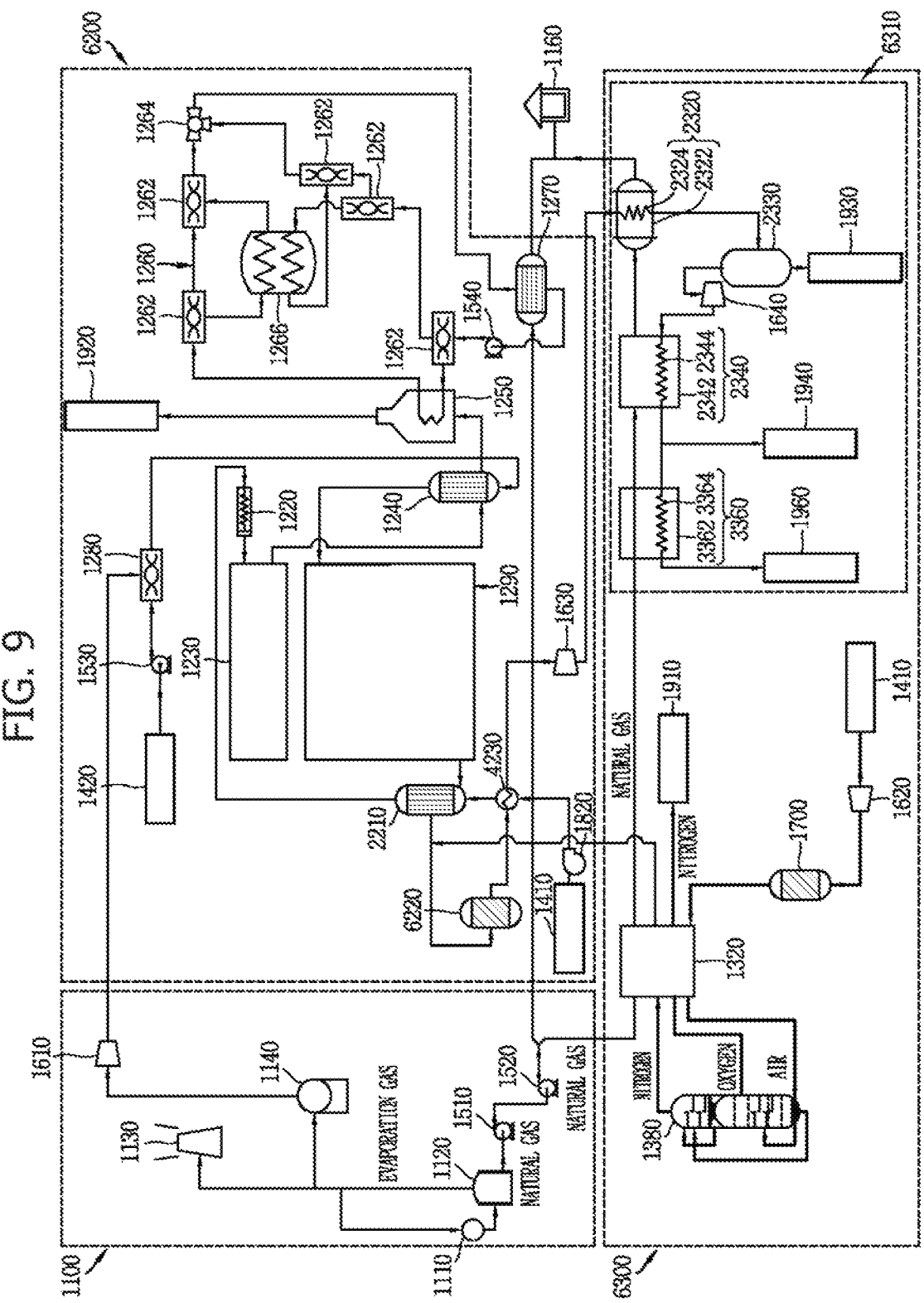
FIG. 9 is a block diagram illustrating a fuel cell system using natural gas in accordance with a seventh exemplary embodiment disclosed herein.

FIG. 9 is a block diagram illustrating a fuel cell using natural gas in accordance with a seventh exemplary embodiment disclosed herein.

As illustrated in FIG. 9, a fuel cell system using natural gas according to a seventh exemplary embodiment may include a natural gas station 1100 which supplies natural gas to a natural gas consumer 1160, a fuel cell 6200 having a cathode 1230 and an anode 1290, and a cryogenic heat-exchanging apparatus 6300 which heat-exchanges the natural gas supplied from the natural gas station 1100 with introduced air and exhaust gas of the fuel cell 6200.

The fuel cell using the natural gas according to the seventh exemplary embodiment is the same as the fuel cell according to the sixth exemplary embodiment, except for including a third gas heat-exchanging unit 3360 which heat-exchanges natural gas passed through the cold box 1320 with anode exhaust gas passed through the second gas heat-exchanging unit 2340.

The third gas heat-exchanging unit 3360 may heat the natural gas passed through the cold box 1320 and solidify liquefied carbon dioxide of the anode exhaust gas passed through the second gas heat-exchanging unit 2340 into dry ice, in the heat-exchanging manner.

The third gas heat-exchanging unit 3360 may include a sixth chamber 3362 through which the natural gas passed through the cold box 1320 passes.

The third gas heat-exchanging unit 3360 may include a sixth passage 3364 through which the liquefied carbon dioxide of the anode exhaust gas passed through the second gas heat-exchanging unit 2340 passes.

Here, the third gas heat-exchanging unit 3360 may be configured such that the liquefied carbon dioxide of the anode exhaust gas passed through the second gas heat-exchanging unit 2340 passes through the sixth chamber 3362 and the natural gas passed through the cold box 1320 passes through the sixth passage 3364.

Detailed description of other same/like components will be omitted to avoid redundant explanation.

Hereinafter, operation effects of the fuel cell using the natural gas according to the seventh exemplary embodiment will be described with reference to FIG. 9.

The operation effects of the fuel cell using the natural gas according to the seventh exemplary embodiment is the same as those according to the sixth exemplary embodiment, except for the processing of the liquefied carbon dioxide of the anode exhaust gas passed through the second gas heat-exchanging unit 2340.

That is, the anode exhaust gas introduced in the gas heat-exchanging unit 6310 may be produced into water, liquefied carbon dioxide and dry ice, while passing through the first gas heat-exchanging unit 2320, the first separator 2330, the compressor 1640, the second gas heat-exchanging unit 2340 and the third gas heat-exchanging unit 3360.

In more detail, the anode exhaust gas introduced into the gas heat-exchanging unit 6310 may be introduced into the fourth passage 2324.

The anode exhaust gas introduced in the fourth passage 2324 may be cooled by natural gas which passes through the fourth chamber 2322 via the second gas heat-exchanging unit 2340.

Vapor contained in the anode exhaust gas which passes through the fourth passage 2324 may be liquefied into water.

The anode exhaust gas passed through the fourth passage 2324 may be introduced into the first separator 2330.

The anode exhaust gas introduced in the first separator 2330 may be processed such that the water can be separated from carbon dioxide.

The water separated in the first separator 2330, for example, may be collected in the water storage space 1930. The water stored in the water storage space 1930 may be supplied to the water supply unit 1420 for reuse.

The carbon dioxide separated in the first separator 2330 may be introduced into the fifth passage 2344.

The anode exhaust gas introduced in the fifth passage 2344 may be cooled by natural gas which passes through the fifth chamber 2342 via the third gas heat-exchanging unit 3360.

The carbon dioxide contained in the anode exhaust gas which passes through the fifth passage 2344 may be liquefied.

Most of the liquefied carbon dioxide contained in the anode exhaust gas passed through the fifth passage 2344 may be introduced into the sixth passage 3364, and the rest of the liquefied carbon dioxide may be collected in the liquefied carbon dioxide storage space 1940.

The liquefied carbon dioxide contained in the anode exhaust gas introduced in the sixth passage 3364 may be cooled by natural gas which passes through the sixth chamber 3362 via the cold box 1320.

The liquefied carbon dioxide contained in the anode exhaust gas which passes through the sixth passage 3364 may be solidified into dry ice.

The dry ice may be collected in the dry ice storage space 1960.

Meanwhile, a natural gas supply line through which the natural gas is supplied from the natural gas station 1100 into the natural gas consumer 1160 may be divided into two lines.

Natural gas supplied through one of the two divided lines may be vaporized by absorbing heat from air introduced into the air separating unit 1380 through the cold box 1320, and absorbing heat from the anode exhaust gas which sequentially passing through the third gas heat-exchanging unit 3360, the second gas heat-exchanging unit 2340 and the first gas heat-exchanging unit 2320.

Natural gas supplied through the other of the two divided lines may be vaporized by absorbing heat from the circulation line 1260 through the SMV 1270.

The vaporized natural gas may be supplied to the natural gas consumer 1160.

Detailed description of the other same operation effects will be omitted to avoid redundant description.

Here, the fuel cell using the natural gas according to the seventh exemplary embodiment may produce oxygen, which is introduced into the fuel cell 2200, using cold energy of the natural gas supplied from the natural gas station 1100.

This may result in reduction of electric energy which is consumed for the oxygen production.

Also, the fuel cell using the natural gas according to the seventh exemplary embodiment may produce by-products, such as water, liquefied carbon dioxide and dry ice, from fuel cell exhaust gas using cold energy of the natural gas.

This may result in improvement of profitability by virtue of those by-products.

Also, an amount of exhaust gas discharged from the fuel cell can be reduced so as to prevent environmental pollution.

In addition, energy which is required for operating devices or facilities to reduce the amount of exhaust gas discharged from the fuel cell may be reduced.

The fuel cell using the natural gas according to the seventh exemplary embodiment may convert the carbon dioxide contained in the atmosphere 1410 into the carbonate ion, thereby reducing carbon dioxide which causes global warming.

The fuel cell using the natural gas according to the seventh exemplary embodiment may vaporize the natural gas supplied to the natural gas consumer 1160 using heat of air introduced from the atmosphere 1410 and heat of the anode exhaust gas introduced into the gas heat-exchanging unit 6310.

Accordingly, an amount of seawater of low temperature, which is discharged into the ocean after vaporizing the natural gas, can be reduced, thereby preventing a bad influence caused due to the seawater of low temperature.

As described above, according to one exemplary embodiment disclosed herein, oxygen which is introduced into a fuel cell can be produced by using cold energy of natural gas, so as to reduce energy which is required for producing the oxygen.

By-products, such as hydrogen, liquefied carbon dioxide and dry ice, can be produced from fuel cell exhaust gas using the cold energy of the natural gas. This may result in improvement of profitability by virtue of the by-products.

Also, an amount of exhaust gas discharged from the fuel cell can be reduced so as to prevent environmental pollution.

In addition, energy which is required for operating devices or facilities to reduce the amount of exhaust gas discharged from the fuel cell may be reduced.

Accordingly, an amount of seawater of low temperature, which is discharged into the ocean after vaporizing the natural gas, can be reduced, thereby preventing a bad influence caused due to the seawater of low temperature.

The configurations and methods of the mobile terminal in the aforesaid embodiments may not be limitedly applied, but such embodiments may be configured by a selective combination of all or part of the embodiments so as to implement many variations.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A fuel cell system using natural gas, comprising:
a fuel cell including a cathode, an anode, a blower, an ejector, an oxidizer, and a heater; and
a cryogenic heat-exchanging apparatus configured to heat-exchange the natural gas supplied from a natural gas station with introduced air or exhaust gas of the fuel cell,
wherein the cryogenic heat-exchanging apparatus comprises:
an air separating unit that is configured to separate oxygen from nitrogen in the introduced air, the oxygen being liquefied oxygen; and
a cold box that is configured to cool the air introduced into the air separating unit,
wherein the cold box comprises:
a natural gas-air heat-exchanging portion that is configured to heat-exchange the natural gas supplied from the natural gas station with the air introduced into the air separating unit, so as to cool the air introduced in the air separating unit; and
a liquefaction unit that is configured to liquefy oxygen contained in the introduced air after the introduced air has passed through the natural gas-air heat-exchanging portion and before the introduced air enters the air separation unit, the liquefaction unit comprising an oxygen-air heat-exchanging portion that is configured to heat-exchange the liquefied oxygen separated in the air separating unit with the introduced air after the introduced air has passed through the natural gas-air heat-exchanging portion, and to vaporize the liquefied oxygen by absorbing heat from the introduced air, wherein the vaporized oxygen is introduced into the cathode from the cryogenic heat-exchanging apparatus via a serial connection of the blower, the ejector, the oxidizer, and the heater, and
wherein: the blower is disposed between the cryogenic heat-exchanging apparatus and a first side of the ejector and is configured to receive a combination of cathode exhaust gas produced by the cathode and the vaporized oxygen produced by the liquefaction unit of the cryogenic heat-exchanging apparatus and to blow the vaporized oxygen and the cathode exhaust gas produced by the cathode;
the ejector is configured to receive, on the first side, the vaporized oxygen and the cathode exhaust gas blown by the blower, to receive, on a second side, anode exhaust gas produced by the anode, and to combine the vaporized oxygen, the cathode exhaust gas, and the anode exhaust gas;
the oxidizer is configured to receive a combined flow of the vaporized oxygen, the cathode exhaust gas, and the anode exhaust gas and to remove hydrogen and carbon monoxide from the combined flow, the hydrogen and carbon monoxide present in the anode exhaust gas discharged from the anode through the ejector; and the heater is connected to the cathode and is configured to receive gases from the oxidizer and to heat oxygen and carbon dioxide having passed through the oxidizer to be supplied to the cathode
wherein the natural gas station is configured to supply at least a portion of the natural gas to a natural gas consumer, wherein the natural gas station includes a waste gas burner which burns boil-off gas (BOG) generated during storage of the natural gas in a storage tank, a buffer tank which temporarily stores the BOG, and a compressor which compresses the BOG discharged from the buffer tank,
wherein the natural gas station is configured to supply the compressed BOG as anode fuel to be supplied to the anode,
wherein the fuel cell system comprises a cathode-exhaust gas-anode fuel heat-exchanging portion configured to heat-exchange the anode fuel supplied to the anode with the cathode exhaust gas produced by the cathode, and
wherein the fuel cell further includes a fuel mixing unit that produces a mixture of the compressed BOG from the compressor of the natural gas station with water supplied from a water supply unit and supplies the mixture to the cathode-exhaust gas-anode fuel heat-exchanging portion.

2. The fuel cell system using natural gas of claim 1, wherein the natural gas-air heat-exchanging portion comprises:
a first chamber through which one of the natural gas supplied from the natural gas station and the air introduced into the liquefaction unit passes; and
a first passage that is provided in the first chamber to be heat-exchangeable, and through which the other of the natural gas supplied from the natural gas station and the air introduced into the liquefaction unit passes.

3. The fuel cell system using natural gas of claim 2, wherein the liquefaction unit further comprises:
a nitrogen-air heat-exchanging portion that is configured to heat-exchange the nitrogen separated in the air separating unit with the air passed through the oxygen-air heat-exchanging portion, so as to cool the air passed through the oxygen-air heat-exchanging portion.

4. The fuel cell system using natural gas of claim 3, wherein the oxygen-air heat-exchanging portion comprises:
a second chamber through which one of the oxygen separated in the air separating unit and the introduced air that has passed through the natural gas-air heat-exchanging portion passes; and
a second passage that is provided within the second chamber to be heat-exchangeable, and through which the other of the oxygen separated in the air separating unit and the introduced air that has passed through the natural gas-air heat-exchanging portion passes.

5. The fuel cell system using natural gas of claim 3, wherein the nitrogen-air heat-exchanging portion comprises:
- a third chamber through which one of the nitrogen separated in the air separating unit and the air passed through the oxygen-air heat-exchanging portion passes; and
- a third passage that is provided within the third chamber to be heat-exchangeable, and through which the other of the nitrogen separated in the air separating unit and the air passed through the oxygen-air heat-exchanging portion passes.

6. The fuel cell system using natural gas of claim 5, wherein the liquefaction unit comprises:
- a refrigerant chamber through which a refrigerant of a refrigerating cycle device passes; and
- a refrigerant chamber air passage that is provided within the refrigerant chamber to be heat-exchangeable, and through which the air passed through the nitrogen-air heat-exchanging portion passes,
- wherein, within the refrigerant chamber, the refrigerant is evaporated by absorbing latent heat and the air passed through the nitrogen-air heat-exchanging portion is further cooled by the refrigerant.

7. The fuel cell system using natural gas of claim 1, wherein the fuel cell system further comprises:
- a circulation line;
- a cathode-exhaust gas-circulation line heat exchanging apparatus configured to heat-exchange the cathode exhaust gas produced by the cathode with the circulation line; and
- a submerged combustion vaporizer configured to heat-exchange the circulation line with the at least the portion of the natural gas supplied by the natural gas station.

* * * * *